United States Patent
Ema et al.

(10) Patent No.: US 7,050,080 B2
(45) Date of Patent: May 23, 2006

(54) IMAGE FORMING APPARATUS FOR CONTROLLING IMAGE WRITING BY ADJUSTING IMAGE CLOCK

(75) Inventors: Hidetoshi Ema, Kanagawa (JP); Akihisa Itabashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1010 days.

(21) Appl. No.: 09/873,256

(22) Filed: Jun. 5, 2001

(65) Prior Publication Data

US 2002/0051137 A1     May 2, 2002

(30) Foreign Application Priority Data

| Jun. 5, 2000 | (JP) | ............................ 2000-167886 |
| Jul. 27, 2000 | (JP) | ............................ 2000-227488 |
| Jul. 27, 2000 | (JP) | ............................ 2000-227497 |

(51) Int. Cl.
    *B41J 2/435*     (2006.01)
(52) U.S. Cl. ........................ 347/235; 347/250
(58) Field of Classification Search ........ 347/234–237, 347/246–250, 252; 250/214 RC
    See application file for complete search history.

(56) References Cited

U.S. PATENT DOCUMENTS

| 4,694,156 A * | 9/1987 | Swanberg .............. 250/214 RC |
| 5,036,519 A | 7/1991 | Ema et al. .............. 372/29.011 |
| 5,050,177 A | 9/1991 | Ema ........................ 372/29.01 |
| 5,138,623 A | 8/1992 | Ema et al. ................ 372/38.07 |
| 5,237,579 A | 8/1993 | Ema et al. ...................... 372/31 |
| 5,258,780 A | 11/1993 | Ema et al. .................. 347/131 |
| 5,325,160 A | 6/1994 | Imakawa et al. .......... 358/3.24 |
| 5,784,091 A | 7/1998 | Ema et al. .................. 347/131 |
| 5,946,334 A | 8/1999 | Ema et al. ................ 372/38.01 |
| 6,118,798 A | 9/2000 | Ema et al. .............. 372/29.011 |
| 6,154,246 A * | 11/2000 | Ogasawara et al. ......... 347/250 |
| 6,381,057 B1 | 4/2002 | Itabashi ...................... 359/204 |
| 6,400,391 B1 | 6/2002 | Suhara et al. ................ 347/244 |
| 6,429,956 B1 | 8/2002 | Itabashi ...................... 359/204 |
| 6,442,183 B1 | 8/2002 | Ema ........................ 372/38.02 |
| 6,462,853 B1 | 10/2002 | Hayashi ...................... 359/205 |
| 6,469,772 B1 | 10/2002 | Itabashi ........................ 355/47 |
| 6,498,617 B1 * | 12/2002 | Ishida et al. ................ 347/252 |

FOREIGN PATENT DOCUMENTS

JP          5-75199          3/1993

(Continued)

OTHER PUBLICATIONS

U.S. Appl. No. 09/873,256, filed Jun. 5, 2001, Ema et al.

(Continued)

*Primary Examiner*—Hai Pham
(74) *Attorney, Agent, or Firm*—Oblon, Spivak, McClelland, Maier & Neustadt, P.C.

(57) ABSTRACT

In an image forming apparatus which uses a semiconductor laser as a light source, a semiconductor laser is controlled by adjustment of an image write-in clock, and a highly accurate scanning position alignment is performed with a simple structure. An optical unit scans a rotational photo conductor by a laser light output by a semiconductor laser. A photodetector detects the laser light output by the semiconductor laser at a predetermined position. An electrostatic latent image is formed by scanning the rotational photo conductor based on the laser light detected by the photodetector. By dividing a clock output from a high-frequency clock generation circuit, an image clock which synchronized with the output of the photodetector is generated, and the phase of the image clock is changed.

44 Claims, 34 Drawing Sheets

FOREIGN PATENT DOCUMENTS

| JP | 5-207234 | | 8/1993 |
|---|---|---|---|
| JP | 5-235446 | | 9/1993 |
| JP | 9-321376 | | 12/1997 |
| JP | 11010949 A | * | 1/1999 |
| JP | 11-167081 | | 6/1999 |

OTHER PUBLICATIONS

U.S. Appl. No. 10/840,369, filed May 7, 2004, Itabashi et al.
U.S. Appl. No. 10/820,733, filed Apr. 9, 2004, Suhara et al.
U.S. Appl. No. 10/448,413, filed May 30, 2003, Itabashi.
U.S. Appl. No. 09/552,657, filed Apr. 19, 2000, Nakajima.
U.S. Appl. No. 09/888,600, filed Jun. 26, 2001, Andoh et al.
U.S. Appl. No. 09/984,236, filed Oct. 29, 2001, Masuda et al.
U.S. Appl. No. 10/143,013, filed May 13, 2002, Suhara et al.
U.S. Appl. No. 10/102,633, filed Mar. 22, 2002, Ameyama et al.
U.S. Appl. No. 10/161,659, filed Jun. 5, 2002, Suzuki et al.
U.S. Appl. No. 10/161,756, filed Jun. 5, 2002, Atsuumi et al.
U.S. Appl. No. 10/207,241, filed Jul. 30, 2002, Suzuki et al.
U.S. Appl. No. 10/200,778, filed Jul. 24, 2002, Amada et al.
U.S. Appl. No. 10/223,294, filed Aug. 20, 2002, Satoh et al.
U.S. Appl. No. 10/319,624, filed Dec. 16, 2002, Ono et al.
U.S. Appl. No. 10/127,768, filed Apr. 23, 2002.
U.S. Appl. No. 09/946,482, filed Sep. 6, 2001.
U.S. Appl. No. 09/955,181, filed Sep. 19, 2001.
U.S. Appl. No. 09/653,330, filed Aug. 31, 2000, allowed.
U.S. Appl. No. 09/715,151, filed Nov. 20, 2000, pending.
U.S. Appl. No. 09/765,608, filed Jan. 22, 2001, pending.
U.S. Appl. No. 09/769,510, filed Jan. 26, 2001, pending.
U.S. Appl. No. 09/788,415, filed Feb. 21, 2001, pending.
U.S. Appl. No. 09/797,563, filed Mar. 5, 2001, allowed.
U.S. Appl. No. 09/810,184, filed Mar. 19, 2001, pending.
U.S. Appl. No. 09/816,378, filed Mar. 26, 2001, pending.
U.S. Appl. No. 09/827,097, filed Apr. 6, 2001, pending.
U.S. Appl. No. 09/833,821, filed Apr. 13, 2001, pending.
U.S. Appl. No. 09/860,520, filed May 21, 2001, pending.
U.S. Appl. No. 09/873,256, filed Jun. 5, 2001, pending.
U.S. Appl. No. 09/910,797, filed Jul. 24, 2001, pending.
U.S. Appl. No. 09/946,665, filed Sep. 6, 2001, pending.
U.S. Appl. No. 09/968,546, filed Oct. 2, 2001, pending.
U.S. Appl. No. 09/982,831, filed Oct. 22, 2001, pending.
U.S. Appl. No. 09/985,753, filed Nov. 6, 2001, pending.
U.S. Appl. No. 10/028,698, filed Dec. 28, 2001, pending.
U.S. Appl. No. 10/047,698, filed Jan. 18, 2002, pending.
U.S. Appl. No. 10/059,371, filed Jan. 31, 2002, pending.
U.S. Appl. No. 10/047,092, filed Jan. 17, 2002, pending.
U.S. Appl. No. 10/084,485, filed Feb. 28, 2002, pending.
U.S. Appl. No. 10/085,707, filed Mar. 1, 2002, pending.
U.S. Appl. No. 10/101,937, filed Mar. 21, 2002, pending.
U.S. Appl. No. 10/247,702, filed Sep. 20, 2002, pending.
U.S. Appl. No. 10/109,696, filed Apr. 1, 2002.
U.S. Appl. No. 09/689,790, filed Oct. 13, 2000, allowed.
U.S. Appl. No. 09/797,574, filed Mar. 5, 2001, pending.
U.S. Appl. No. 10/095,913, filed Mar. 13, 2002, pending.
U.S. Appl. No. 10/214,559, filed Aug. 9, 2002, pending.
U.S. Appl. No. 10/183,748, filed Jun. 28, 2002, pending.

* cited by examiner

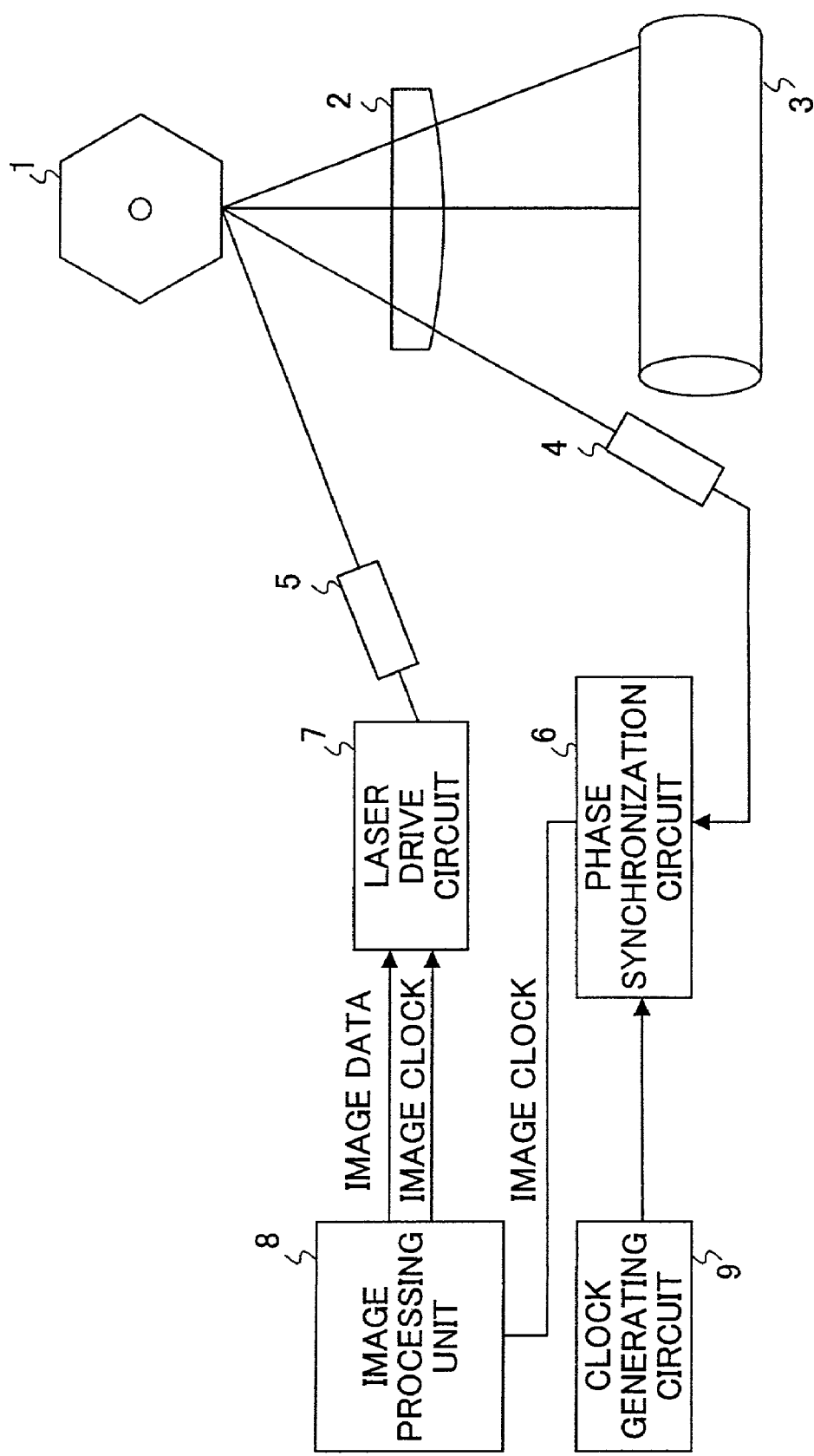

SPECIFIC WEIGHT AT EACH IMAGE HEIGHT ON A SURFACE TO BE SCANNED WHEN PEAK IS SET TO 1

EXPOSURE ENERGY DISTRIBUTION

OPTICAL PATTERN

Pulse-Modulation-Unit

FIG.14

SLANT

IMAGE FORMING APPARATUS FOR CONTROLLING IMAGE WRITING BY ADJUSTING IMAGE CLOCK

BACKGROUND OF THE INVENTION

1. Field of the Invention

The present invention relates to an image forming apparatus and, more particularly, to an image forming apparatus such as a lazar printer or a digital copying machine which carries out modulation control of the output light of a semiconductor laser so as to use as an optical writing apparatus.

2. Description of Related Art

The semiconductor laser is small, and is widely used as a light source of an optical writing apparatus used for an image forming apparatus such as a laser printer or a digital copying machine since high-speed modulation can be performed. However, since the relationship between the drive current of a semiconductor laser and an optical output changes with temperature remarkably, a problem may occur when an attempt is made to set an optical intensity of a semiconductor laser to a desired value.

APC (Automatic Power Control) system is known as a method of using the semiconductor laser, which solves such a problem. In APC system, an optical output of a semiconductor laser is monitored by a light-receiving element, and a normal direction current of the semiconductor laser is always controlled to be a desired value by an optical-electronic negative feedback loop which controls the normal direction current of the semiconductor laser so that a signal proportional to a light-receiving current proportional to the optical output of the semiconductor laser generated in the light-receiving element and a luminescence level instruction signal become equal to each other.

Japanese Laid-Open Patent Applications No. 05-075199, No. 05-235446, No. 09-321376, No. 11-167081, and No. 05-207234 discloses a technology with respect to the above-mentioned APC system.

Japanese Laid-Open Patent Application No. 05-75199 discloses a semiconductor laser control apparatus which achieves high-speed modulation while controlling a temperature characteristic and a droop characteristic of a semiconductor laser by constituting an optical-electric negative feedback loop for controlling the semiconductor laser by continuously comparing a light-receiving current and a luminescence instruction current of a light-receiving element which monitors an optical output of a semiconductor laser, and by modulating the semiconductor laser at a high speed by supplying to the semiconductor laser an output current of the optical-electric negative feedback loop by adding a current proportional to the luminescence instruction current.

Japanese Laid-Open Patent Application No. 05-235446 discloses a semiconductor laser control apparatus which incorporates a semiconductor laser protection circuit with a simple structure for preventing a surge current when a power is turned on and degradation of the semiconductor laser by an excessive current in an unstable state of circuits.

Japanese Laid-Open Patent Application No. 09-321376 discloses a technology which is realized so that a semiconductor laser control apparatus applied to an image forming apparatus, to which a current adding system that reduces an amount of control by an optical-electric negative feedback loop and a pulse width intensity mixing modulation system in a single dot are applied, is realized with smaller size and power saving and further higher integration.

Namely, Japanese Laid-Open Patent Applications No. 5-075199, No. 5-235446 and No. 9-321376 suggest realization of a control of a temperature characteristic and droop characteristic and high-speed modulation by the method of constituting an optical-electric negative feedback loop for controlling the semiconductor laser at a high speed by continuously comparing a light-receiving current and a luminescence instruction current of a light-receiving element which monitors an optical output of a semiconductor laser, and by modulating the semiconductor laser at a high speed by supplying to the semiconductor laser an output current of the optical-electric negative feedback loop by adding a current proportional to the luminescence instruction current.

However, due to the characteristic of the light-receiving element that monitors the optical output of a semiconductor laser, the linearity of the light-receiving current output characteristic with respect to the optical input of the light-receiving element will deteriorate remarkably if the optical output of a semiconductor laser becomes small. For this reason, the control accuracy in the case of a low light output may become bad, and there may be a case in which an optical output is larger than a predetermined optical output. In such a case, there is a possibility of having bad influences, such as background contamination, in a laser printer and the like.

Moreover, since the optical output is always controlled, an optical output cannot be turned off completely so as to have the control system to carry out a normal operation, thereby making an offset light generated. Moreover, a drive current setting circuit, which sets up the drive current to the semiconductor laser, is needed, and restrictions may be given to a circuit scale when an attempt is made to improve the function of optical modulation ICs of a laser printer or the like.

Furthermore, since the light-receiving element which detects only optical output of a single semiconductor laser is needed, means is required externally for separating and detecting optical outputs to separate and detect each optical output when one light-receiving element detects the output of a plurality of lasers such as a semiconductor laser array.

Moreover, Japanese Laid-Open Patent Application No. 11-167081 discloses a pixel clock frequency setting method by a direct synthesizer. According to this method, a frequency change can be performed at a high speed by changing a frequency unit by changing data of LUT (look-up table). However, since a frequency variable unit and output frequency change speed are closely related to the control speed of a subsequently connected PLL-LOOP and low-pass passage filter, restrictions are given at the time of designing the entire structure. Moreover, a frequency unit is dependent on a master clock frequency and the number of bits of LUT, and in order to perform a fine setup, it is required to increase a circuit scale or to make a master clock a high speed, thereby accompanying difficulties to realize a single chip structure.

Moreover, although Japanese Laid-Open Patent Application No. 5-207234 discloses a method of adding a phase error to PLL-LOOP, a frequency error of a pixel clock is generated in this method unless an addition signal of phase error stability is very stable. This will become large restrictions in an attempt to make a single chip IC by unifying a digital circuit and an analog circuit.

Next, a further description will be given, with reference to FIG. 1, of a conventional image forming apparatus. In FIG. 1, a laser light emitted from a semiconductor laser unit 21 is scanned by rotation of a polygon mirror 22. The scanned laser light forms optical spots on a scanned medium (photo conductor) 24 through a scanning lens 23, exposes the scanned medium 24 and forms an electrostatic latent image. At this time, formation of the electrostatic latent image on the scanned medium 24 is controlled by controlling the light-emitting time of the semiconductor laser based on image data generated by the image-processing unit 26 and an image clock of which phase is set up by a phase synchronous circuit 29. Moreover, the phase synchronous circuit 29 sets the phase of the clock generated by a clock generating circuit 28 to a phase which is synchronized with a photodetector which detects the light of the semiconductor laser which is scanned by the polygon mirror 22.

As mentioned above, in the image forming apparatus which uses a laser scanning optical system, a laser drive circuit 27, the phase synchronous circuit 29 and the clock generation circuit 28 are indispensable in a position accuracy and interval accuracy of the electrostatic latent image formed on the scanned medium 24. For this reason, a clock having the same frequency with the image clock is needed for many circuits in the image forming apparatus, and there is a possibility of causing a problem of EMI (Electro Magnetic Inference) of the image forming apparatus. Moreover, it also induces a cost rise due to an increase in the number of parts. Furthermore, it becomes very difficult to operate an image data transfer clock at completely the same timing in entire system as a printing speed increases, and, thereby, data must be transferred in parallel by image data transfer with a slow clock.

Moreover, in recent years, a multi-beam optical system which attains high speed and high density is being adopted in connection with the high speed and high density of a laser printer by recording not only by a light from a single light source but by lights from a plurality of light sources. However, there are a case in which a plurality of semiconductor lasers are used as a light source and a case in which a semiconductor laser array on which a plurality of light-emitting points are arranged in monolithic on a single chip, and it is preferable that these are selected, if necessary, from a systematic viewpoint.

However, conventionally, since the light-receiving element is common to all semiconductor lasers with respect to the semiconductor laser array, the methods recited in the above-mentioned Japanese Laid-Open Patent Applications No. 5-75199, No. 5-235446, No. 9-321376, etc. cannot be used, which results in an increased cost when the semiconductor laser array is used.

Moreover, although a continuous control is needed in order to remove the influence of the temperature characteristic, the droop characteristic, etc. of the semiconductor laser as recited in Japanese Laid-Open Patent Applications No. 5-75199, No. 5-235446, No. 9-321376, etc., an offset light may arise so as to perform a simultaneous, continuous control. Moreover, a current setting circuit, etc. is needed which results in an increase in a circuit scale. Furthermore, when a semiconductor laser array is used, means for separating and detecting each optical output must be externally provided.

Moreover, the beam profile of a semiconductor laser is usually approximated to Gaussian distribution, and an electrostatic latent image in an electronic photograph system is formed according to Gaussian distribution. For this reason, the electrostatic latent image is not in binary values, and analog-distribution parts generate according to an increase in resolution. Accordingly, it is easily influenced by external fluctuation factors, such as changes in a development bias, and it tends to easily cause fluctuation in image intensity.

Furthermore, although the pixel clock frequency setting method by the direct synthesizer which is disclosed in Japanese laid-Open Patent Application No. 11-167081 can change frequency at a higher speed by changing the frequency unit by changing the data of LUT, a frequency variable unit and output frequency change speed closely relate to control speed of PLL-LOOP and the low-pass filter, which are subsequently connected, and give restrictions on the entire structure design. Moreover, since a frequency unit is dependent on a master clock frequency and the number of bits of LUT, in order to perform a fine setup, it will need to increase a circuit scale or increase a master clock speed, which accompanies difficulty in realizing a single chip IC.

Moreover, in the method of adding a phase error to PLL-LOOP as disclosed in Japanese Laid-Open Patent Application No. 5-207234, the frequency error of a pixel clock may occur unless the addition signal of the phase error is stable very much. This may give large restrictions when attaining a single ship IC by unifying a digital circuit and an analog circuit.

Moreover, in a deflector such as a polygon scanner, the variation in the distance from the axis of rotation of a deflection reflective surface (variation in an inscribed circle radius) generates unevenness in the scanning speed of the optical spot (scanning beam) which scans a surface to be scanned. After detecting synchronous light, a write-in signal is issued at a predetermined timing and a semiconductor laser starts light emission, data corresponding to a single scanning line is sent to each source of light emission, and thereby, an image is formed as a latent image on a scanned medium.

At this time, as shown in FIGS. 2A and 2B, unevenness (variation) of the scanning length of each scanning line appears according to the above-mentioned factor in the deflector such as a polygon scanner. Such unevenness is mainly conspicuous at an edge of image as well as a write-in magnification error, and the variation in the above-mentioned write-in end appears as fluctuation of an image end. The influence on the image by the factor of the above-mentioned deflector is larger as closer to the end, and degradation of image quality is conspicuous, although fluctuation of an image is also generated not only at an end but also in the middle. This degradation of the image quality by fluctuation of an end needs to be corrected when there is a demand for a high-definition quality of image.

Furthermore, in the case of a multi-beam optical system, it is necessary to correct scanning width since when there is a difference in the oscillation wavelength of each source of light emission, an offset of exposure position occurs in a case of an optical system in which a color aberration of a scanning lens is not corrected, and a difference is generated in the scanning with, when an optical spot corresponding to each source of light emission scans on the scanned medium, for each source of light emission, which becomes a cause of degradation of image quality.

Moreover, the interval of light-emitting points of a semiconductor laser array has a limit in positioning the light-emitting points closer to each other due to influences of a thermal cross-talk or an electric cross-talk. Moreover, it becomes a cost demerit to make many kinds of light-emitting point intervals of a semiconductor laser array. However, various scanning optical systems have been developed with the write-in density or scanning width, and there are various magnifications of a scanning optical system. Therefore, in order to obtain arbitrary scanning pitches on a surface to be scanned, the pitch of the light-emitting point is apparently made into a desired pitch in the sub-scanning direction by slanting a semiconductor laser array. However, when a semiconductor laser array is slanted, the scanning start position on the surface to be scanned which is formed by a light flux projected by each light-emitting point is shifted. Moreover, even when the semiconductor laser array is not slanted, the scanning start position on the surface to be scanned shifts due to position offset of the light-emitting point caused by a machining error during a manufacturing process of the semiconductor laser array. Since this becomes a cause of degradation of image quality, it needs to correct the scanning start position.

Furthermore, in the case in which a light source part of a multi-beam optical system is constituted by combining a plurality of semiconductor lasers, it is necessary to correct a scanning start position since there is a problem that the scanning start position shifts in the same manner as mentioned above, which becomes a cause of degradation of image quality.

Moreover, in an optical system design, although a high performance (reduction of an image surface curve, reduction of a magnification error, reduction of a scanning line bend, etc.) of an optical system is attained for achieving a high image quality of an output image, there is a limit also in it due to restrictions from the number of sheets, field composition and the quality of the material of the optical element of an optical system. Therefore, in order to attain further high performance, the increase in the number of sheets of the optical elements, introduction of a special form surface and use of an expensive optical material are needed, and, thus, issues related to a cost increase, an improvement in design difficulty and an improvement in machining difficulty of the optical system arises.

SUMMARY OF THE INVENTION

It is a general object of the present invention to provide an improved and useful image forming apparatus in which the above-mentioned problems are eliminated.

A more specific object of the present invention is to provide an image forming apparatus which can perform a highly accurate scanning position alignment with a simple structure by performing a semiconductor laser control by adjusting an image write-in clock in an image forming apparatus using the semiconductor laser as a light source.

Another object of the present invention is to provide an image forming apparatus which can obtain a high quality image by correcting a position offset of a plurality of light-emitting points in a primary scanning direction in a case in which a semiconductor laser array is use in a slanted state, a machining error of manufacturing semiconductor laser array occurs or a light source part is constituted by combining a plurality of semiconductor lasers.

Additionally, a further object of the present invention is to provide an image forming apparatus in which can realize miniaturization, high speed and low cost by incorporating circuits, which generate an image write-in clock and control a semiconductor laser array, into a single IC chip.

In order to achieve the above-mentioned objects, there is provided according to one aspect of the present invention an image forming apparatus comprising: a semiconductor laser; an optical unit which scans a rotational photo conductor by a laser light output by said semiconductor laser; and a photodetector which detects the laser light output by said semiconductor laser at a predetermined position, wherein a latent image is formed by scanning said rotational photo conductor based on the laser light detected by the photodetector, said image forming apparatus further comprising: a high-frequency clock generation circuit; a first frequency divider which generates and outputs an image clock which synchronized with an output of said photodetector by dividing a clock output from the high-frequency clock generation circuit; and an image clock phase changing circuit which changes a phase of the image clock.

According to the above-mentioned invention, since the phase of the image clock can be changed, the scanning speed of the semiconductor laser according to the scanning optical system and the wavelength of the semiconductor laser can be adjusted by fine adjustment of the phase of the image clock. Accordingly, a highly accurate scanning position alignment can be realized with a simple structure.

In the present invention, said high-frequency clock generation circuit may comprise: a voltage controlled oscillator which controls an oscillation frequency of a clock, which is output according to an input signal; a second frequency divider which divides the clock oscillated by the voltage controlled oscillator; a phase comparator which compares a phase of the clock output by the frequency divider with a phase of a frequency of a reference clock so as to output a signal corresponding to a result of the comparison, wherein the signal output by the phase comparator is input to said voltage controlled oscillator.

Since the high-frequency clock generating circuit is constituted by the PLL circuit, an adjustment of scanning speed of the light output by the semiconductor laser can be performed by performing a course adjustment for adjusting the output frequency of PLL and a fine adjustment by the phase change circuit, and, thus, the adjustment range of the scanning speed can expanded, which provides an image forming apparatus which realizes a highly accurate position alignment.

Additionally, the image forming apparatus according to the present invention may further comprise: an image data input circuit which inputs image data based on said image clock; a modulation pattern generation circuit which generates a modulation pattern based on said image data and the clock output from said high-frequency clock generation means; and a semiconductor laser control circuit which controls the output of said semiconductor laser based on the modulation pattern generated by the modulation pattern generation means.

That is, since the high-frequency clock generating circuit is constituted by the PLL circuit, an adjustment of scanning speed of the light output by the semiconductor laser can be performed by performing a course adjustment for adjusting the output frequency of PLL and a fine adjustment by the phase change circuit, and, thus, the adjustment range of the scanning speed can expanded, which provides an image forming apparatus which realizes a highly accurate position alignment.

Said first frequency divider, said image clock phase change circuit, said high-frequency clock generator, said image data input circuit and said modulation pattern generation circuit may be constituted by an integrated circuit formed in a single semiconductor chip.

Thereby, since the phase of the pixel clock can be changed from the frequency which is N times the pixel clock, the pixel clock can be fine controlled in equivalent manner, and, thus, the pixel position can be accurately maintained even if a fluctuation is generated in the wavelength of the semiconductor laser.

Additionally, the image forming apparatus according to the present invention may further comprise a frequency dividing ratio setting circuit which sets a frequency dividing ratio by said frequency dividing means by loading from outside. Accordingly, since the data which is loaded at the data load timing of the frequency dividing circuit, the pixel clock frequency can be easily fine-controlled.

Additionally, the image forming apparatus according to the present invention may further comprise a pulse reversal circuit which reverses or forwards a phase of pulses oscillated by said voltage controlled oscillator. Accordingly, a high quality image can be formed with a simple structure.

Additionally, the image forming apparatus according to the present invention may further comprise a frequency dividing operation stop and resumption circuit which stops or resumes an operation of said second frequency divider. Accordingly, the pixel clock frequency can be easily fine-controlled, and a high quality image can be formed.

Additionally, the image forming apparatus according to the present invention may further comprise a semiconductor laser turn-off circuit which switches off said semiconductor laser at a timing which delays the phase of said pixel clock. Since the semiconductor laser is switched off at a timing for delaying the phase of the pixel clock, a change in the image intensity due to the phase change in the pixel clock can be eliminated, and a high quality image van be formed.

Additionally, there is provided according to another aspect of the present invention an image forming apparatus comprising: a semiconductor laser; an optical unit which scans a rotational photo conductor by a laser light output by said semiconductor laser; and a photodetector which detects the laser light output by said semiconductor laser at a predetermined position, wherein a latent image is formed by scanning said rotational photo conductor based on the laser light detected by the photodetector, said image forming apparatus further comprising: a high-frequency clock generation circuit; a frequency divider which generates and outputs an image clock which synchronized with an output of said photodetector by dividing a clock output from the high-frequency clock generation circuit; an image data input circuit which inputs image data based on said image clock; a semiconductor laser modulation circuit which modulates an output of said semiconductor laser based on a clock output from said high-frequency clock generation means and the image data which input said image data input means; and a phase change circuit which changes a timing which said image data input means takes in the image data and a phase of said image clock at the same time.

According to the above-mentioned invention, since a phase difference can be set between the output pixel clock and the internal clock, it can be set so that a time delay for transmitting the image data with an image data transmitting circuit block connected to the integrated circuit becomes appropriate.

In the above-mentioned invention, said phase change circuit may change the timing for taking in the image data and the phase of the clock of said image clock based on a first synchronous signal at a time of power supply and a turn-off data timing of synchronous signal detection data. Accordingly, since the image data transmission time delay with the image data transmission circuit block connected to the integrated circuit can be reset when a power is turned on, a high-speed pixel clock can be generated, and at the same time the semiconductor laser can be controlled.

Additionally, said phase change circuit may change the timing for taking in the image data and the phase of said image clock for every scanning timing. Accordingly, since the image data transmission time delay with the image data transmission circuit block connected to the integrated circuit can be set so that it automatically becomes appropriate for each scanning line, the high-speed pixel clock can be generated by a single integrated circuit, and at the same time the semiconductor laser can be controlled.

Additionally, said phase change circuit may change the timing for taking in the image data and the phase of said image clock only at a first line of a page. Accordingly, since the image data transmission time delay with the image data transmission circuit block connected to the integrated circuit can be set so as to be appropriate for the beginning of one page, the high-speed pixel clock can be generated by a single integrated circuit, and at the same time the semiconductor laser can be controlled.

Additionally, the phase of said image clock may be changed when being output, and the timing which said image data input circuit takes in data and a timing which said modulation pattern generating circuit generates a modulation pattern may not be changed. That is, since the image data transmission time delay with the image data transmission circuit block connected to the integrated circuit can be set so as to be appropriate and only the phase of the delivery pixel clock is changed, the high-speed pixel clock can be generated by a single integrated circuit, at the same time the semiconductor laser can be controlled, and easily constructed.

Additionally, there is provided according to another aspect of the present invention an image forming apparatus comprising: an optical scanning unit which scans a plurality of light fluxes on a medium to be scanned, the light fluxes being synchronous with an output pixel clock and being modulated in accordance with image data of a respective one of a plurality of lines; and a clock phase control circuit which controls a phase of said output pixel clock for each of said lines so as to correct a shift in a write start position in a scanning direction due to a shift in a position of each light-emitting point of said plurality of light fluxes.

According to the above-mentioned invention, since the phase of the output pixel clock for each of the lines is controlled so as to correct a shift in a write start position in a scanning direction due to a shift in a position of each light-emitting point of the plurality of light fluxes, a high quality image can be obtained by correcting the position shift of the plurality of light-emitting points in the primary scanning direction.

Additionally, there is provided according to another aspect of the present invention an image forming apparatus comprising: an optical scanning unit which scans a plurality of light fluxes on a medium to be scanned by deflecting the light fluxes by a deflector, the light fluxes being synchronous with an output pixel clock and being modulated in accordance with image data of a respective one of a plurality of lines; and a clock phase control circuit which controls a phase of said output pixel clock for each of a plurality of deflecting surfaces of said deflector so as to correct a fluctuation in a scanning length corresponding to the plurality of deflecting surfaces.

According to the above-mentioned invention, a fluctuation in the scanning length (a difference between optical scanning widths of the scanning lines) generated by the deflector of a polygon scanner as a cause and associated fluctuation which appears at an image end can be corrected.

In the above-mentioned invention, said clock phase control circuit may comprise: a high-frequency clock generator; a first frequency divider which generates said output pixel clock by dividing an output of said high-frequency clock generator, the first frequency divider having a circuit which can change a phase of said output pixel clock; a phase change circuit which changes a phase of said first frequency divider; and a second frequency divider which generates an internal clock by dividing an output of said high-frequency clock generator, the second frequency divider having a circuit which can change a phase of said internal clock.

Accordingly, since the phase difference between the output image (pixel) clock and the internal clock can be set, the image data transmission time delay with the image data transmission circuit block connected to the IC can be appropriately set. Accordingly, a high-speed image (pixel) clock can be generated and at the same time the semiconductor laser can be controlled, and such an IC can be provided.

Additionally, said high-frequency clock generator may be constituted by a PLL circuit comprising: a voltage controlled oscillator circuit; a programmable counter which divides an output of said voltage controlled oscillator circuit; and a phase comparator circuit which compares phases of an output of said programmable counter and a reference frequency, wherein said first frequency divider generates said output pixel clock by dividing an output of said voltage controlled oscillator circuit and a phase of said output pixel clock is synchronized with a phase synchronous signal.

Accordingly, a freedom of setting the frequency of the high-frequency clock is improved, and image (pixel) clock can be synchronized with the write position. Additionally, the semiconductor laser can be controlled simultaneously with the generation of a high-speed image (pixel) clock, and such an IC can be provided.

Additionally, the image forming apparatus according to the present invention may further comprise a modulation pattern generating circuit which generates a modulation pattern by which an optimum exposure energy is obtained based on the image data in synchronization with said output pixel clock.

Accordingly, a freedom of setting the frequency of the high-frequency clock is improved, and a high-speed optical modulation pattern, by which an optimum exposure energy can be obtained, can be generated from the image data. Additionally, the semiconductor laser can be controlled simultaneously with the generation of a high-speed image (pixel) clock, and such an IC can be provided.

Additionally, said modulation pattern generating circuit may change a phase of the output pixel clock for each of a plurality of lines. Accordingly, a high speed can be achieved, and positions of a plurality of light-emitting points can be finely adjusted. Additionally, the semiconductor laser can be controlled simultaneously with the generation of the image (pixel) clock, and such an IC can be provided.

Additionally, said first frequency divider, said phase change circuit, said PLL circuit and said modulation pattern generating circuit may be formed in a single integrated circuit. Accordingly, since the semiconductor laser modulation drive circuit can be provided at different location, a layout around the light source can be easy, and an IC which can control the semiconductor laser can be provided simultaneously with the generation of a high-speed image (pixel) clock.

Additionally, said integrated circuit may further comprise a semiconductor laser modulation drive circuit. Accordingly, a high speed can be achieved since circuit parts having a high transmission rate are integrated, and, according to the present invention, an IC which can control the semiconductor laser can be provided simultaneously with the generation of a high-speed image (pixel) clock.

Other objects, features, and advantages of the present invention will become more apparent from the following detailed description when read in conjunction with the accompanying drawings.

BRIEF DESCRIPTION OF THE DRAWINGS

FIG. 1 is a figure showing a structure of a conventional image forming apparatus;

FIG. 14 is an illustration for explaining a method in which the number of bits of LUT is reduced;

DETAILED DESCRIPTION OF THE PREFERRED EMBODIMENTS (First embodiment)

A description will now be given, with reference to FIG. 3 through FIG. 24 of an image forming apparatus according to the present invention. It should be noted that the image forming apparatus according to the present embodiment has a structure the same as that of the scanning lens 2 and the photodetector 4 with respect to the photo conductor 3 in the optical write-in system of the image forming apparatus shown in FIG. 1.

Figure 2A:
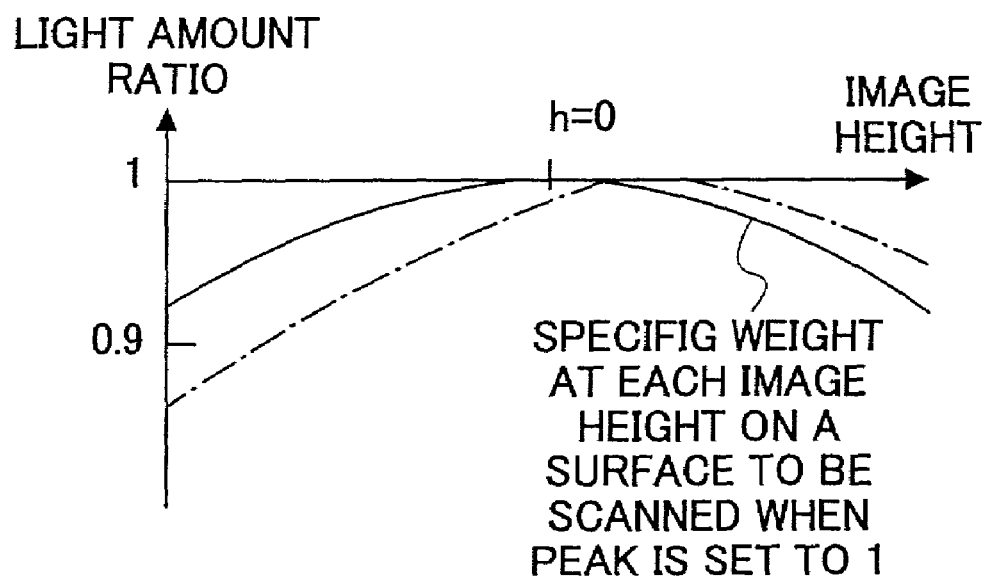
FIGS. 2A and 2B are illustrations for showing variation in an image end caused by a deflector.
Figure 2B:
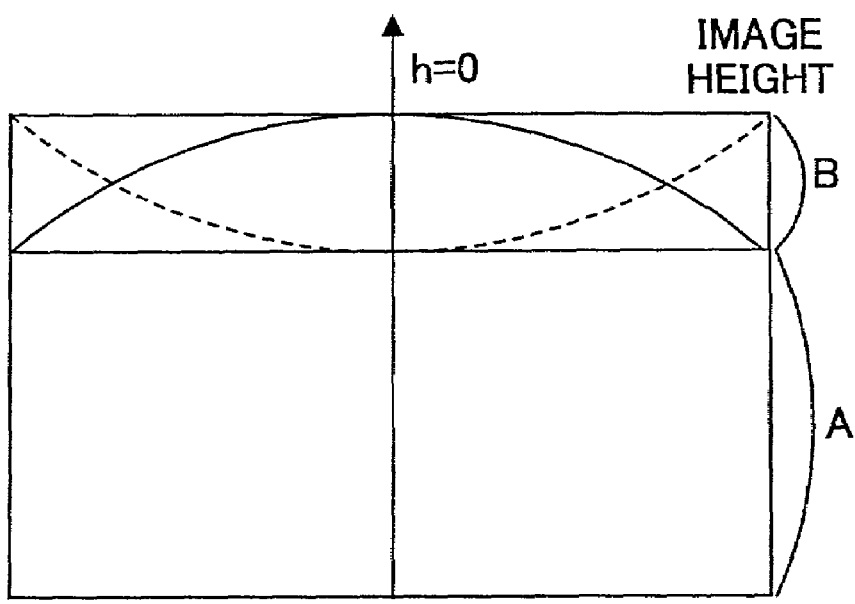
Figure 3:
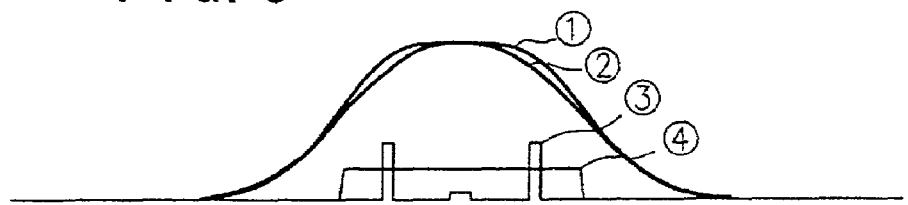
FIG. 3 is a graph showing a relationship between an optical modulation pulse and exposure energy.
Figure 31:
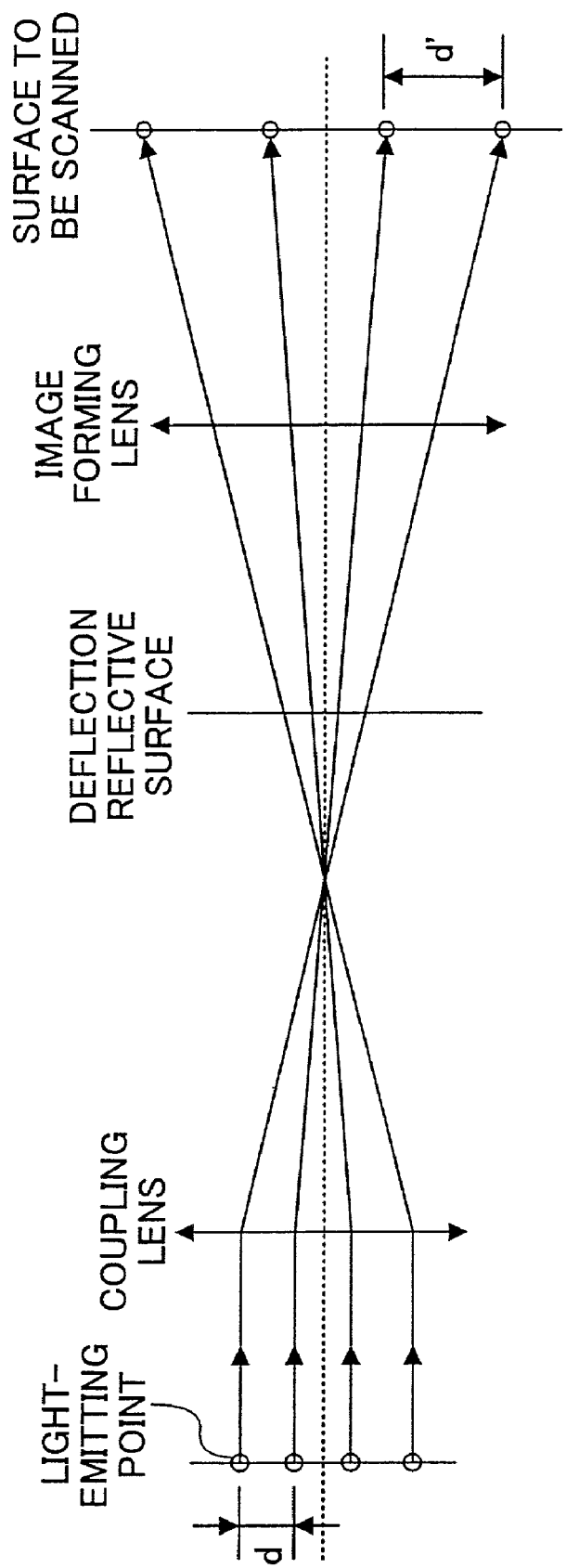
FIG. 31 is an illustration for explaining scanning by a plurality of light-emitting points.

FIG. 3 is a graph showing a relationship between an optical modulation pulse and exposure energy. In FIG. 31, ④ indicates an example of a conventional optical modulation pulse. ② indicates exposure energy when a beam profile has Gaussian distribution in an optical system in which an image is formed on a photo conductor surface after making semiconductor laser light parallel light by a collimate lens and passing a scanning optical system. In the present embodiment, an optical pulse has a pattern which is indicated by ③, exposed by the same optical system and has an exposure energy distribution as indicated by ①.

Figure 4:
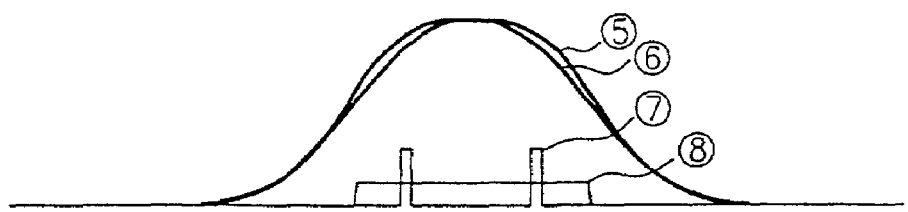
FIG. 4 is a graph showing a relationship between the optical modulation pulse and exposure energy in a conventional case in which the optical modulation pulse shown in FIG. 3 is narrowed.

FIG. 4 is a graph showing a relationship between the optical modulation pulse and exposure energy in a conventional case in which the optical modulation pulse shown in FIG. 3 is narrowed. Similar to this, this, the exposure energy in the present embodiment becomes that corresponds to a case in which the modulation pattern of the light is changed.

Figure 5:
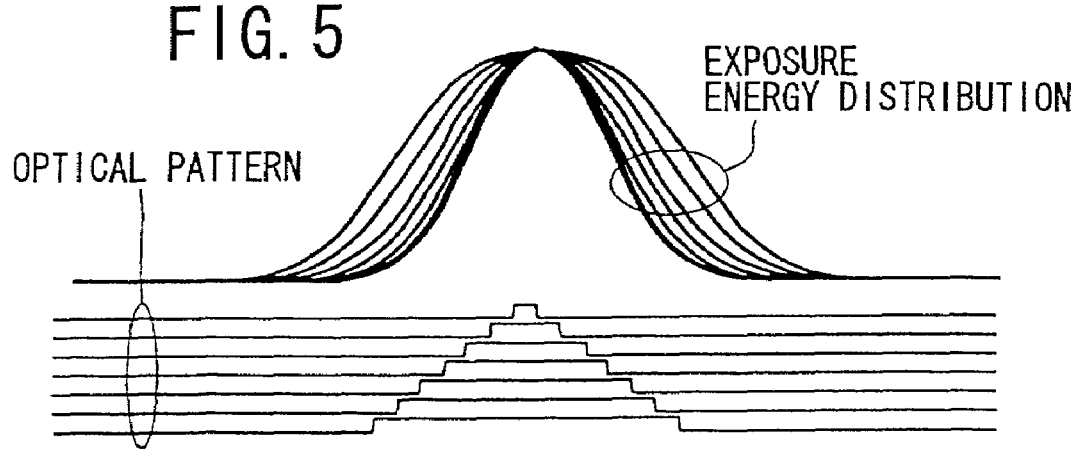
FIG. 5 is graph showing distribution of the exposure energy in a case in which the modulation pattern of the light is sequentially changed.
Figure 6:
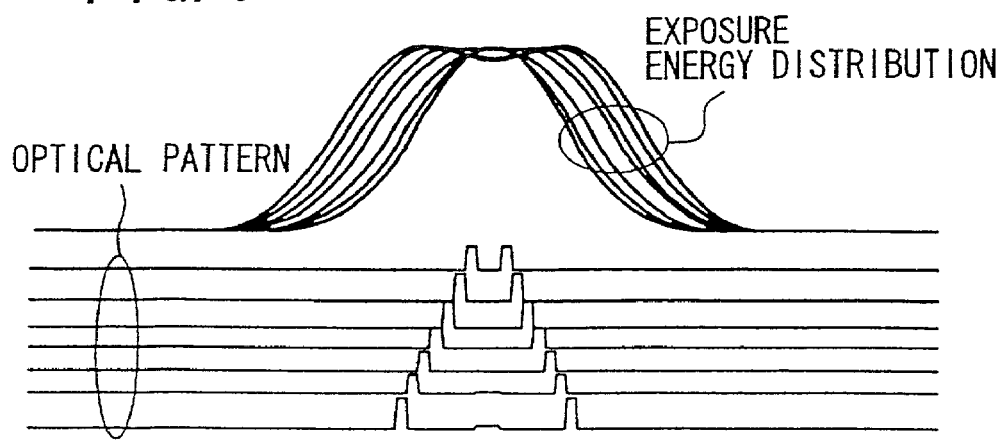
FIG. 6 is a graph showing distribution of the exposure energy in a case in which the exposure energy is changed by the modulation pattern.

FIG. 5 is graph showing distribution of the exposure energy in a case in which the modulation pattern of the light is sequentially changed, and FIG. 6 is a graph showing distribution of the exposure energy in a case in which the exposure energy is changed by the modulation pattern. The optical modulation pattern shown in FIG. 4 is a combination of a first optical pulse sequence and a second optical pulse lighted at a center, the second pulse sequence being symmetrical pulses, like that indicated by the optical patterns shown in FIG. 4, as indicated by ③ in FIG. 3 and ⑦ in FIG. 4.

If the interval of the first pulses is narrowed, an exposure energy distribution exhibits a steep curve. On the other hand, if the interval of the first pulses is enlarged, an exposure energy distribution exhibits a gently-sloping curve. In this case, a fall in the center of an exposure energy distribution is suppressed by the second pulse.

As shown in the above figure, a steep exposure energy curve which is close to a case in which a diameter of an optical beam is reduced by about 20% by exposing by the optical pulse of the present embodiment. Accordingly, an image with sufficient graininess (S/N ratio) can be obtained since the same surface potential distribution as a case where a photo conductor surface potential distribution is made smaller that a beam diameter will be obtained. Moreover, this method is also an effective method when an object onto which a laser beam is projected is rotating, although the scanning optical system has been explained to the modulation of this laser beam.

Figure 7:
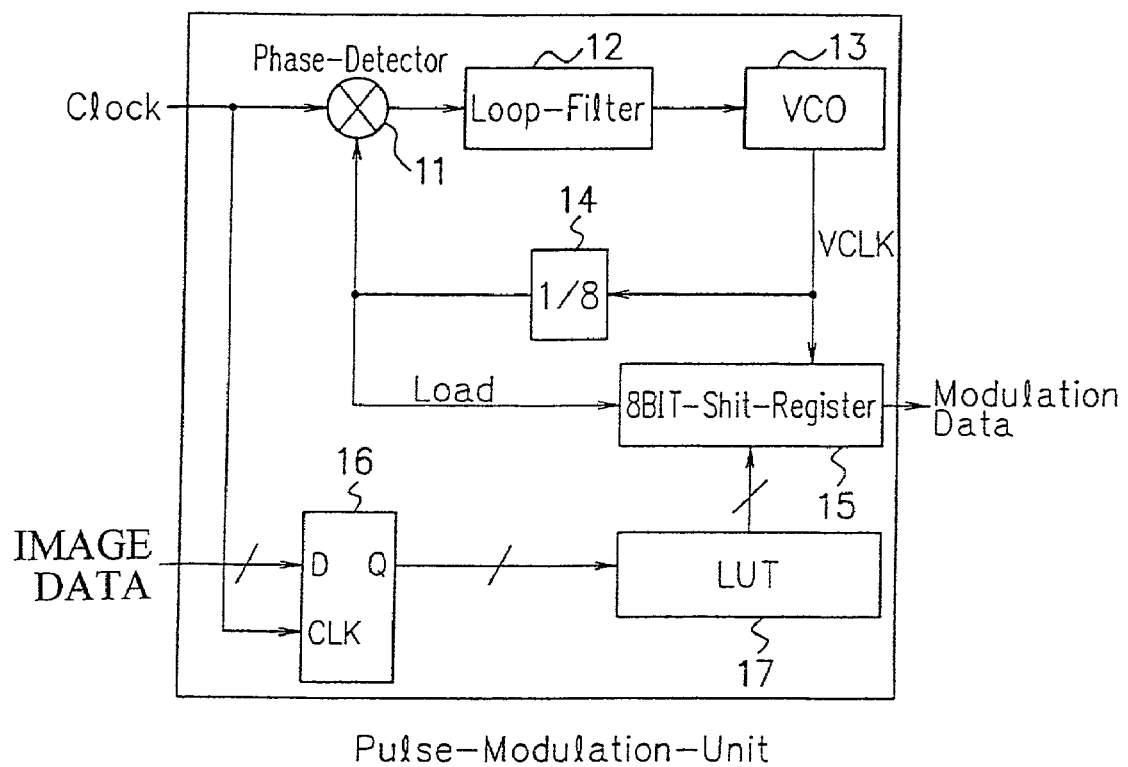
FIG. 7 is a block diagram of a modulation data generating circuit for producing optical pulse sequence.

FIG. 7 is a block diagram of a circuit which generates modulation data for generating the above-mentioned optical pulse sequence. In FIG. 7, image data is converted into data corresponding to an modulation pulse sequence by LUT (Look Up Table) 17 based on a Clock for transmitting image data, and is loaded to Shift-Register 15 according to a Load signal.

Figure 8:
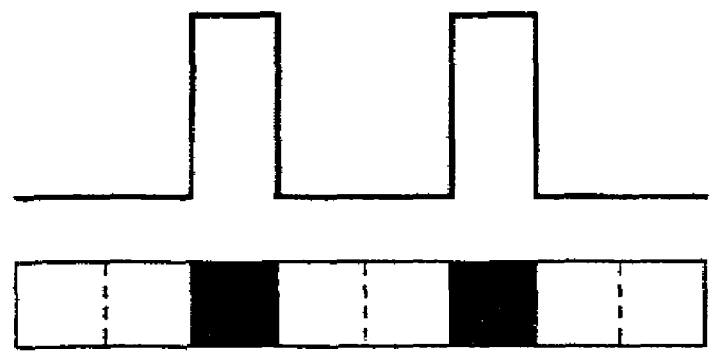
FIG. 8 is an illustration showing data for generating an optical pulse.
Figure 9:
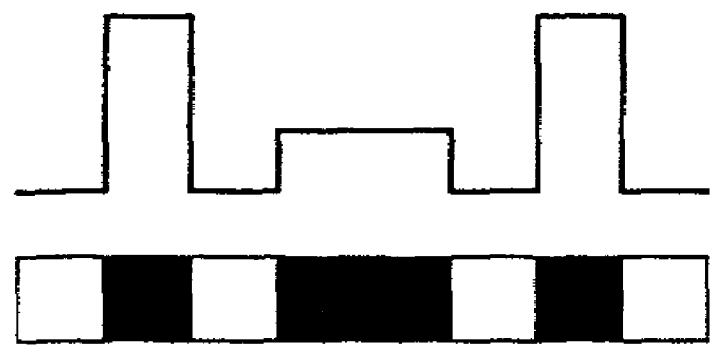
FIG. 9 is an illustration showing data for generating an optical pulse.

A Phase-Detector 11, a Loop-Filter 12, a VCO 13, and a 1/8 frequency divider 14 constitute a PLL-LOOP which octuples the Clock so as generate VCLK 8 times the frequency of Clock. A Shift-Register 15 outputs modulation data according to VCLK. The optical pulse of ⑦ of FIG. 4 is generated by data which is shown in FIG. 8, and the optical pulse of ③ of FIG. 3 is generated by data which is shown in FIG. 9.

Additionally, by changing image data by LUT, the optical pulse shown in FIGS. 3 and 4 can be freely selected in the same circuit only by changing the contents of LUT, when a laser scanning optical system changes. According to the above-mentioned structure, the optical modulation pulse with high freedom can be generated, and a good image having high graininess can be obtained.

Figure 10:
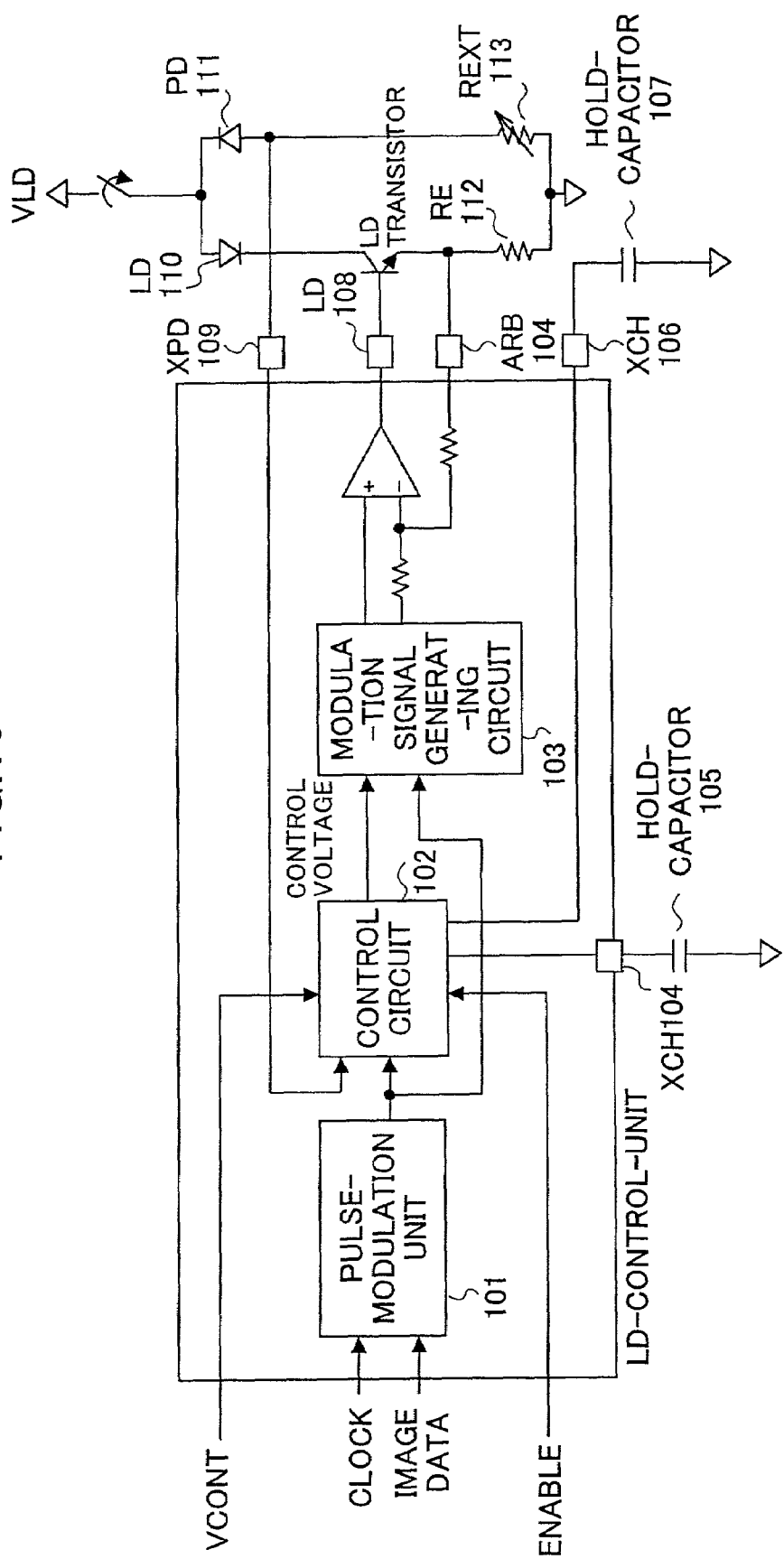
FIG. 10 is a circuit structure diagram of a circuit for controlling and modulating a semiconductor laser in response with data from a Pulse-Modulation-Unit shown in FIG. 5.

FIG. 10 shows a circuit for controlling and modulating the semiconductor laser according to data from Pulse Pulse-Modulation-Unit 101 show in FIG. 5. In a case of an optical output $P_0$, a voltage (an optical excitation current is changed into voltage through REXT 113), which is generated by an output current of PD (light-receiving element) 111 which receives a light of LD (semiconductor laser) 110 is detected at the XPD terminal 109 by the control circuit 102. The detected voltage is controlled by comparing with VCONT voltage, and the result of control is held by a Hold-Capacitor 107 connected to an XCH terminal 106.

Moreover, when an optical output is $P_1$, it is controlled similarly, and the result of control is held by a Hold-Capacitor 105. The optical output is modulated in multiple stages on the assumption that the optical output is linear with respect to a voltage between $P_0$ and $P_1$ (practically, this linearity is materialized with high accuracy by the I-L characteristic of the semiconductor laser). When the Modulation-Data is set to Dn (data which changes at the rate of VCLK), a semiconductor laser drive current is ln, the Hold-Capacitor 1 and the Hold-Capacitor 2 are respectively set to V1 and V2, and $P_1=P_0/2$:

$$\ln=\{(V_0-V_1)\times Dn+V1\}/RE$$

where Dn is set by a control circuit 102 and a modulation signal generating circuit 103 so as to be Dn=−1 to 1.

Thus, the optical pulse pattern of the semiconductor laser can be generated according to the output data from the Pulse-Modulation-Unit 101, and the exposure energy distribution shown in FIGS. 3 and 4 can be generated with a relatively simple structure, which gives an image having good graininess.

In the circuit shown in FIG. 7, although the frequency VCLK which is as large as 8 times the pixel clock is generated from the pixel clock, the pixel clock is usually also generated from a standard clock. Since the exposure position offset due to color aberration is easily generated depending on the oscillation wavelength of a laser, a pixel clock generation circuit is required so as to perform a fine control of the pixel clock. However, if such a circuit is provided separately, jitter of the PLL circuit will be accumulated doubly, which results in comparatively high cost.

Figure 11:
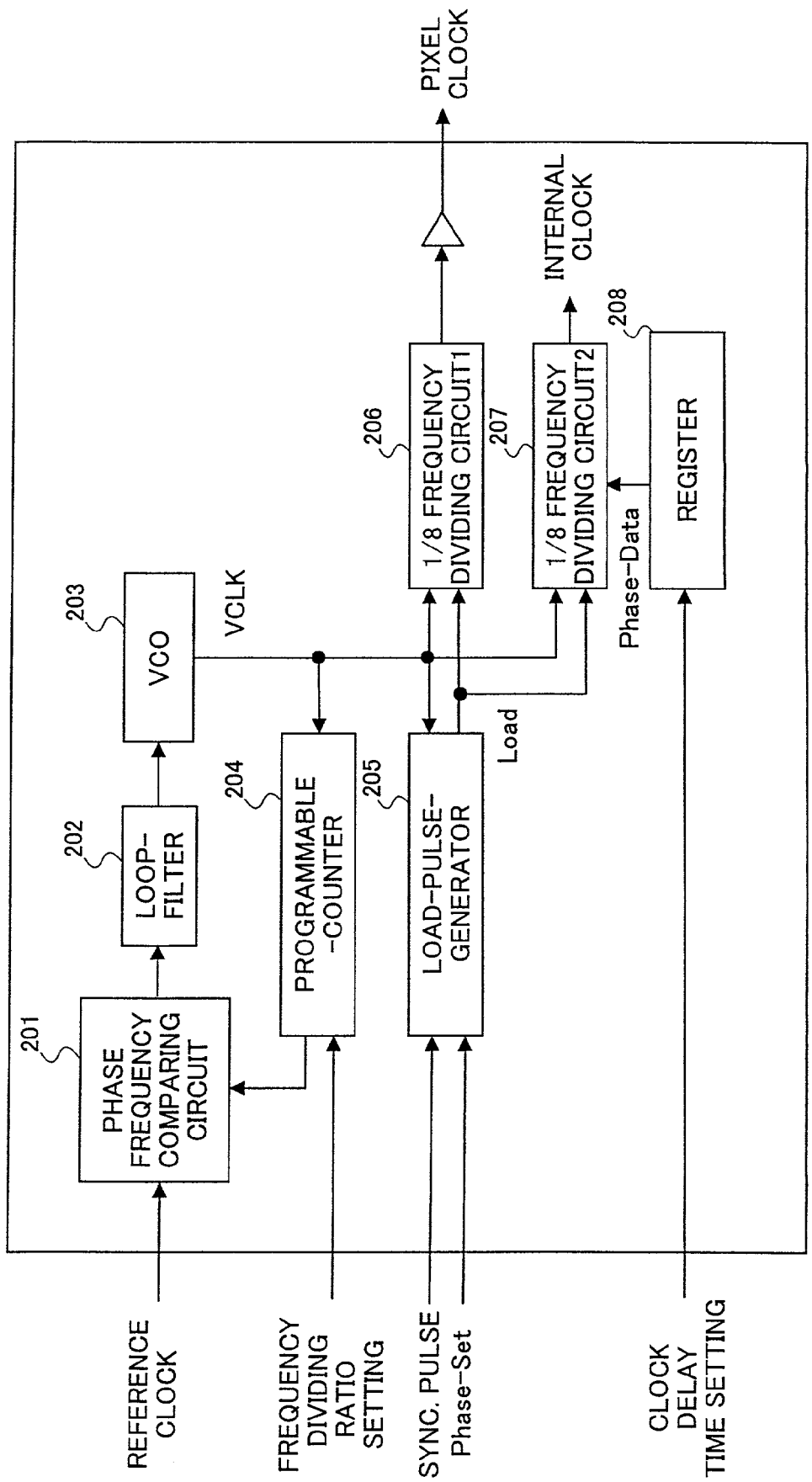
FIG. 11 is a block diagram of a circuit which realizes generation of VCLK and generation of a pixel clock.

FIG. 11 is a block diagram of a circuit which solves the above-mentioned problem and realizes generation of VCLK, and generation of the pixel clock. In FIG. 11, a PLL-LOOP is constituted by a phase frequency comparison circuit 201, a Loop-Filter 202 and a VCO 203. The phase frequency comparison circuit 201 compares VCLK with a standard clock which has been divided by N by a Programmable-Counter 204. The Loop-Filter 202 filters the result of the phase frequency comparison circuit 201. The oscillation frequency of the VCO 203 changes based on an output voltage of the Loop-Filter 204. VCLK is generated by the PLL-LOOP described above.

Moreover, a dividing ratio N of the Programmable-Counter 204 is set by an external dividing ratio setup operation. Based on VCLK and a phase synchronous pulse, the pixel clock which synchronized with the phase synchronous pulse is generated at one eighth of the frequency of VCLK by loading data 0' to the ⅛ frequency-dividing circuit 206.

Moreover, ⅛ frequency-dividing circuit 207 generates an internal clock having a phase difference from the pixel clock by loading preset phase data to the same timing. When ⅛ frequency-dividing circuit 207 is not needed when the pixel clock is slow or when a time delay till image data transmission does not make a problem.

However, in a case in which the frequency of the pixel clock is high, when image data is taken in from an external source which is synchronous with the output, it the data cannot be correctly taken in since there is a problem in the delay time from output of the pixel clock to input of the image data. In such a case, it is avoidable by making variable the phase of an image data taking-in clock to an output pixel clock based on the phase data which is previously set up like the present embodiment.

Furthermore, in the present embodiment, the count (frequency-dividing) of ⅛ frequency-dividing circuit 206 and the ⅛ frequency-dividing circuit 207 can be made enable or disable by a Phase-Set signal. This catches a rising edge of a Phase-Set signal by VCLK, and stops the counting (frequency dividing) operation for one clock cycle of the VCLK. By doing in this way, the phase of the pixel clock and the internal clock can be delayed by ⅛ clock unit.

By performing an amount of phase delay of ⅛ clock cycle at a predetermined interval (or close to the predetermined interval) during one single scanning period, the frequency of the pixel clock during one scanning period can be fine-controlled in equivalent. This is equivalent to set up more finely the frequency variable step which can be set up in the PLL-LOOP.

In order to finely set the frequency variable step of the PLL-LOOP in practice, it is also possible to make a standard clock lower or to make VCLK higher at the same time the frequency-dividing setting range of the Programmable-Counter 204 is enlarged. However, if the standard clock is made lower, a frequency change of VCLK can be detected only by a standard cycle clock, stabilization of the oscillation frequency of the VCO 23 becomes a large technical subject. On the other hand, in order to make VCLK high, the oscillation frequency of the VCO 203 must be made high, which also becomes a technical subject.

According to the present invention, if VCO can be made high, a frequency setup can be attained at a step exceeding it, and if VCO can be stabilized, a frequency setup will be attained at a step exceeding it.

Moreover, the discontinuity of the amount of exposure energy can be canceled by being made not to emit a light by a semiconductor laser during ⅛ clock cycle during which the phase delay is generated by the Phase-Set signal. Additionally, the Phase-set signal may be set when the semiconductor laser does not emit light. Furthermore, the Phase-set signal may be set in the position shifted for each scanning. Furthermore, by changing the amount of phase delay at such timing, the phase of the pixel clock can be changed without influencing the output image.

Moreover, the position of each pixel can be controlled for every ⅛ clock cycle by changing the Phase-set signal so that only the start timing is increased or decreased at a constant unit for each scanning (for example, 1/8→2/8→3/8→4/8→5/8→6/8→7/8→0). Thus, a high-definition image can be obtained by finely controlling a screen angle of an image output.

Figure 12:
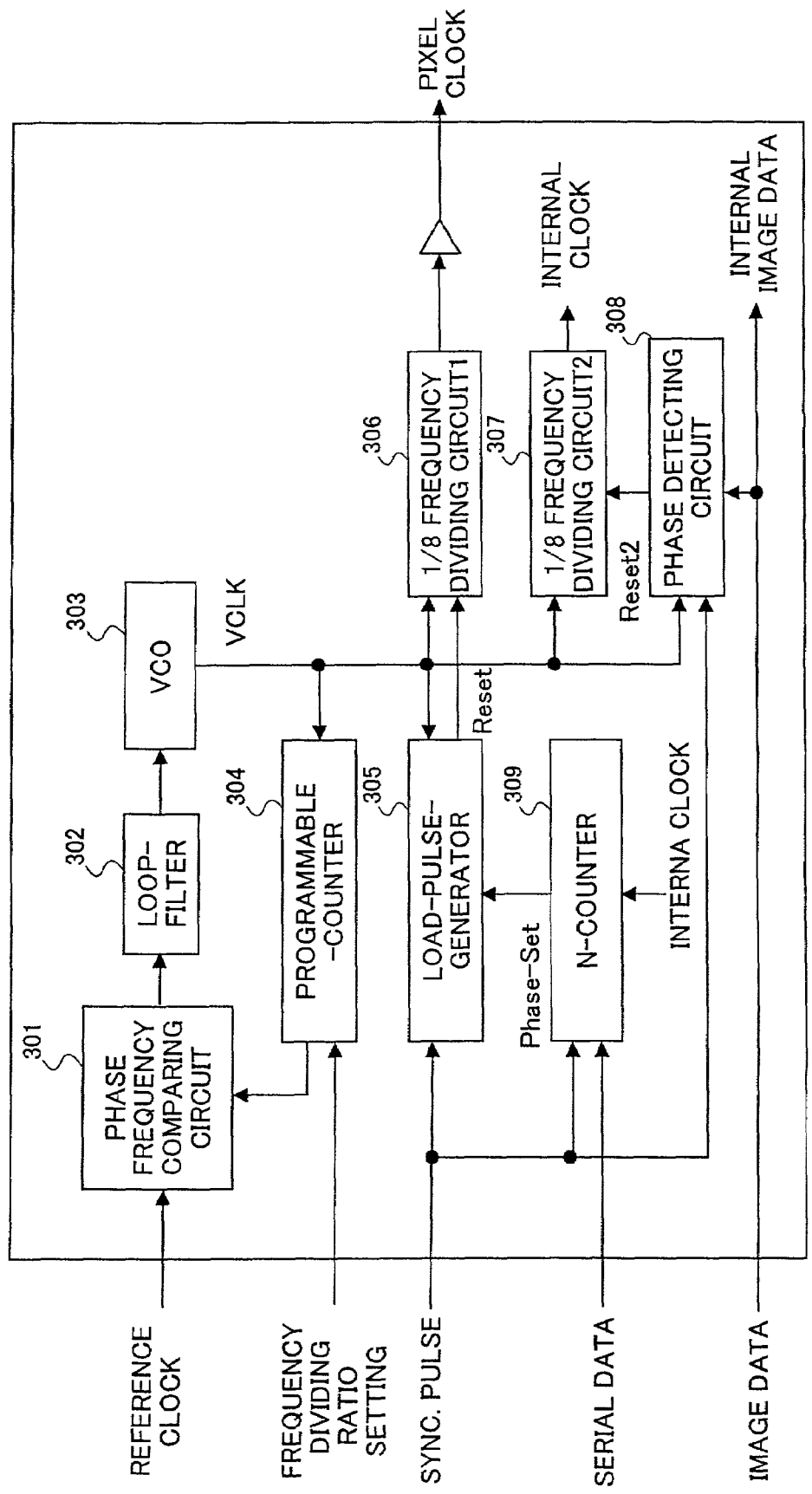
FIG. 12 is a block diagram of a circuit constituted so that a ⅛ pixel clock phase is delayed.

FIG. 12 is a block diagram of a circuit which have an N-Counter 309 therein and is configured to automatically generate the Phase-Set signal for each N-count so as to delay the phase of the ⅛ pixel clock. In the present embodiment, an optical pulse is not output for a time of ⅛ clock. It should be noted that in FIG. 12, parts that are the same as the parts shown in FIG. 11 are given reference numerals having the same lower two digits, and description will be omitted. For example, the phase frequency comparison circuit 301 shown in FIG. 12 is a part equivalent to the phase frequency comparison circuit 201 shown in FIG. 11.

The circuit structure shown in FIG. 12 does not make the exposure energy distribution to be discontinuous as shown in FIG. 1. This is because the light is off for a sufficiently sort time with respect to a beam diameter of the semiconductor laser and an interval timing of the pixels. It should be noted that the count value N of the N-Counter 309 can be set by serial data.

Since frequency having a unit which cannot be set by the PLL-LOOP can be set by the serial data, a frequency unit can be finely set in equivalent.

Figure 13:
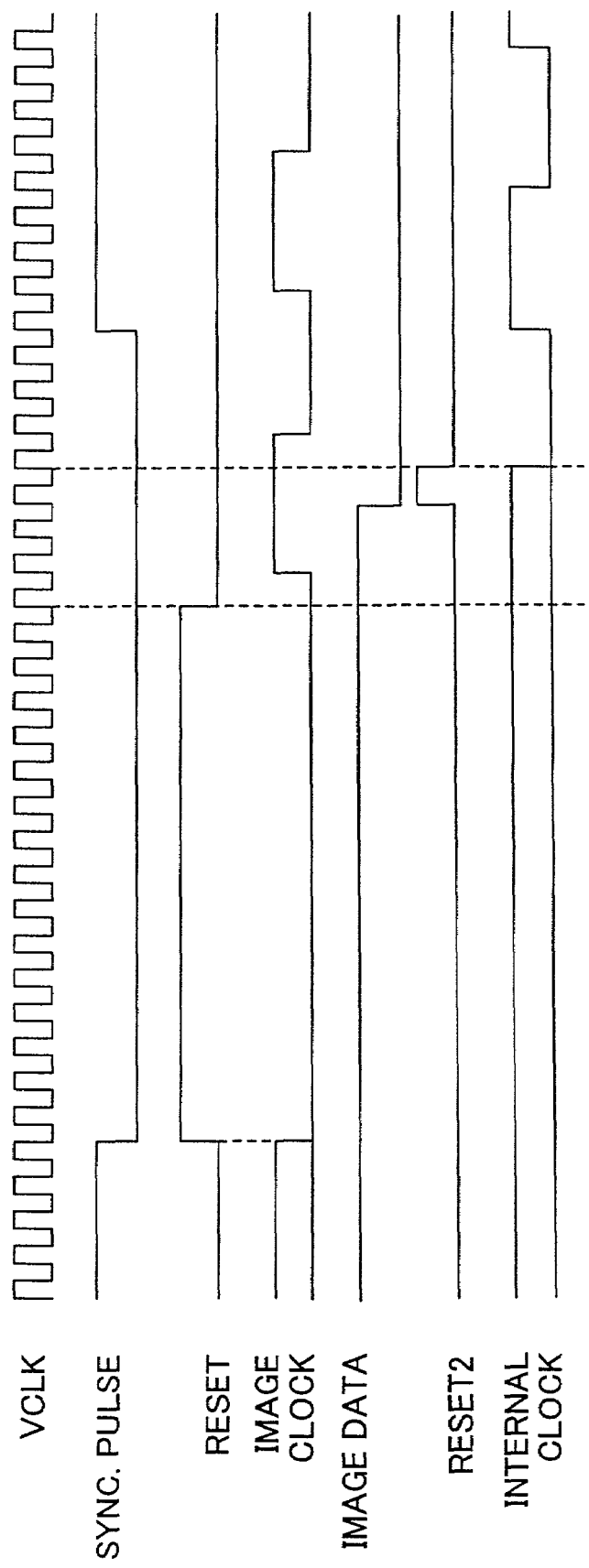
FIG. 13 is timing chart of an operation in which the phase of an internal clock to a pixel clock is operated according to phase data.
Figure 15:
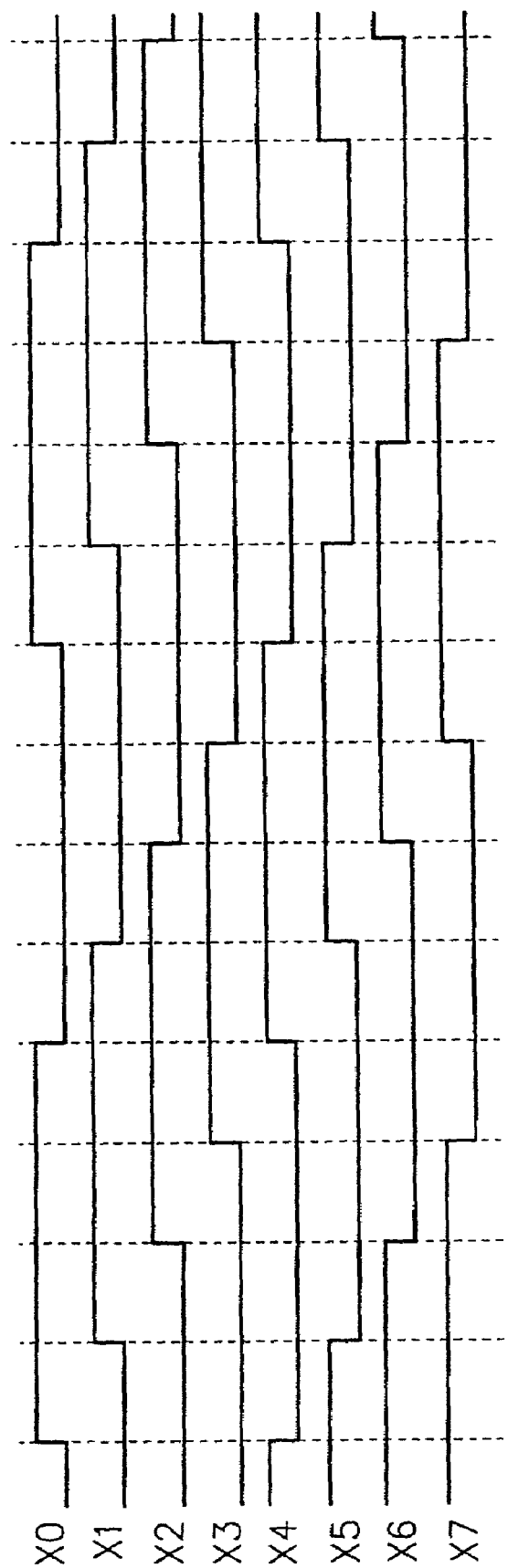
FIG. 15 is an illustration showing pulse sequence when VCLK is divided by 8.

FIG. 13 is a timing chart of an operation in which the phase of the internal clock corresponds to the phase data with respect to the image clock. Indicted from a top are VCLK, a synchronous pulse, a Load signal, a pixel clock, image data, and a Reset 2 signal. Additionally, an operation shown in FIG. 13 is achieved only when a phase detection Set signal is Low. By doing in this way, when the phase detection Set signal is Low, the synchronous pulse is always effective, and the phase relation between the internal clock and the image data can be controlled. On the other hand, the initially set phase difference can be maintained by setting the phase detection Set signal to low only at an initial time after a power is turned on.

Figure 14:
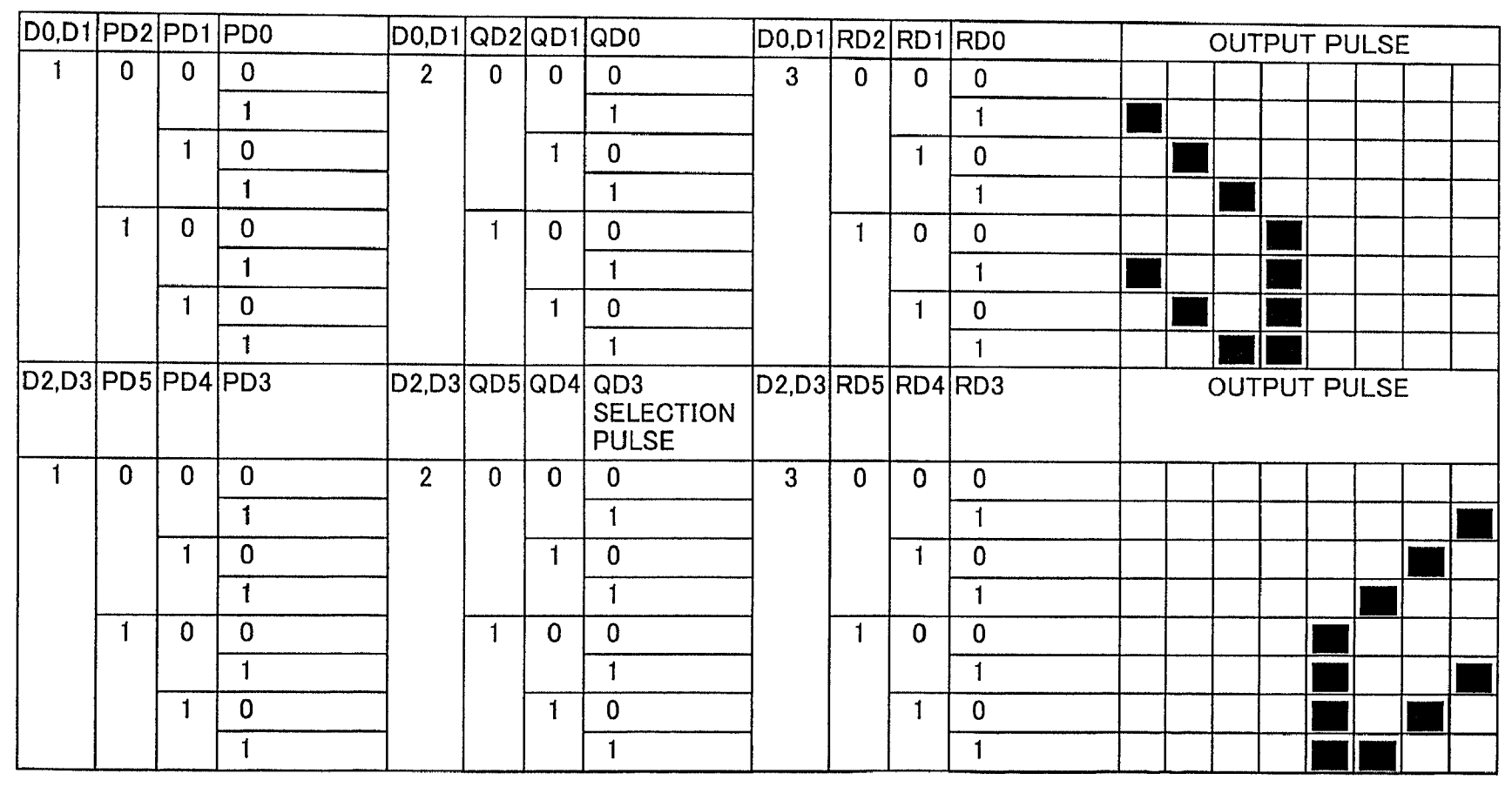

FIG. 14 is an illustration for explaining a method of a case in which the number of bits of LUT is reduced in comparison with the case of the circuit shown in FIG. 7. In the method shown in FIG. 14, right and left pulse can be independently selected based on the enter of a single pixel as a reference. Since a selection table is set so as to select 8 phase pulses (shown in FIG. 15) for dividing VCLK by 8, a method of generating a pulse at an arbitrary position is shown.

Although the pulse sequence range which can be selected is narrower than that of the circuit shown in FIG. 7 in the above-mentioned way, it is effective when obtaining the optical pulses shown in FIG. 4 and FIG. 6 at a low cost since the circuit scale of LUT becomes small.

Figure 16:
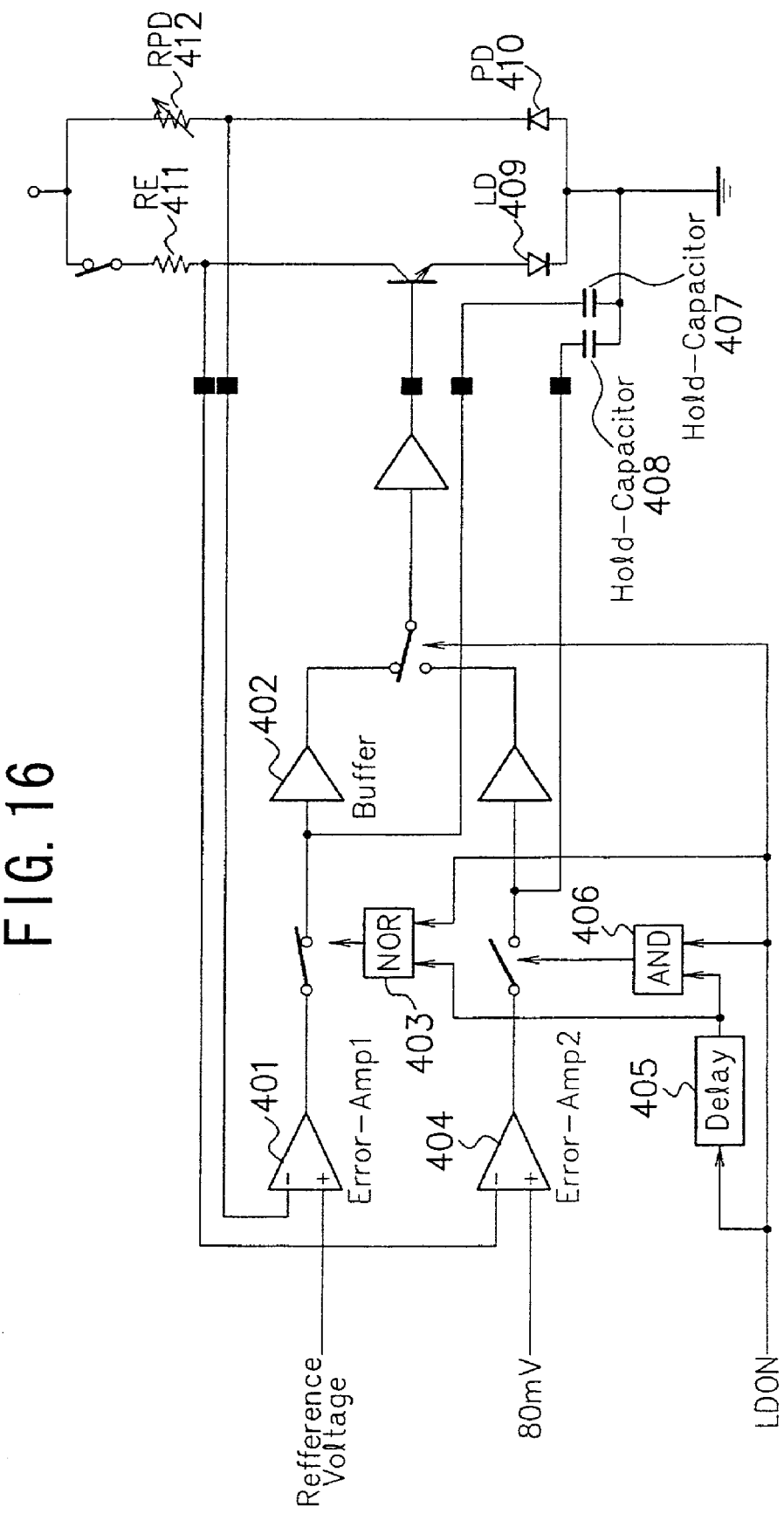
FIG. 16 is a circuit diagram of a circuit having a cathode rendered to be common in a circuit structure in which the peak value of optical intensity and a bias current of a semiconductor laser.

FIG. 16 shows a circuit used for a semiconductor laser of which cathode is common in a circuit diaphragm in which a peal value of an optical output intensity and a bias current of the semiconductor laser are controlled. The optical output of the semiconductor laser is detected by Error-Amp 401 through a PD (light-receiving element) 410. The result of detection is compared with a reference voltage which is converted into a voltage. A control value is retained by a Hold-Capacitor 407. In the present embodiment, the result of control of the Error-Amp 404 is held by a Hold-Capacitor 408 so that a voltage of an RE terminal 411 is controlled to be a voltage of VCC-80 mV.

It should be noted that the control timing of the Error-Amp 401 is controlled so that a constant time delay is provided in an active state in which the semiconductor laser is turned on. Moreover, the Error-Amp 404 performs a control by a constant time when an LDON signal is inactive so that a bias current when the semiconductor laser is turned off becomes a constant value.

As mentioned above, by starting the control with a constant time delay from the LDON signal, a light-receiving current of the light-receiving element, which is converted from the optical output of the semiconductor laser, is converted into a voltage so that an error dose not occur due to a time delay in the transmission of the signal to the Error-Amp 401. Additionally, it is also the same in the control timing of the bias current.

Furthermore, by connecting the semiconductor laser to an emitter of a bipolar transistor, the voltage is supplied to the semiconductor laser so that a delay is not generated in a base voltage of a bipolar as much as possible. Therefore, in the present embodiment, the composition is taken which obtains a predetermined optical output is taken by making voltage across the terminals of the semiconductor laser into a predetermined voltage. According to the above-mentioned structure, the semiconductor laser can be modulated at a high speed.

Figure 17:
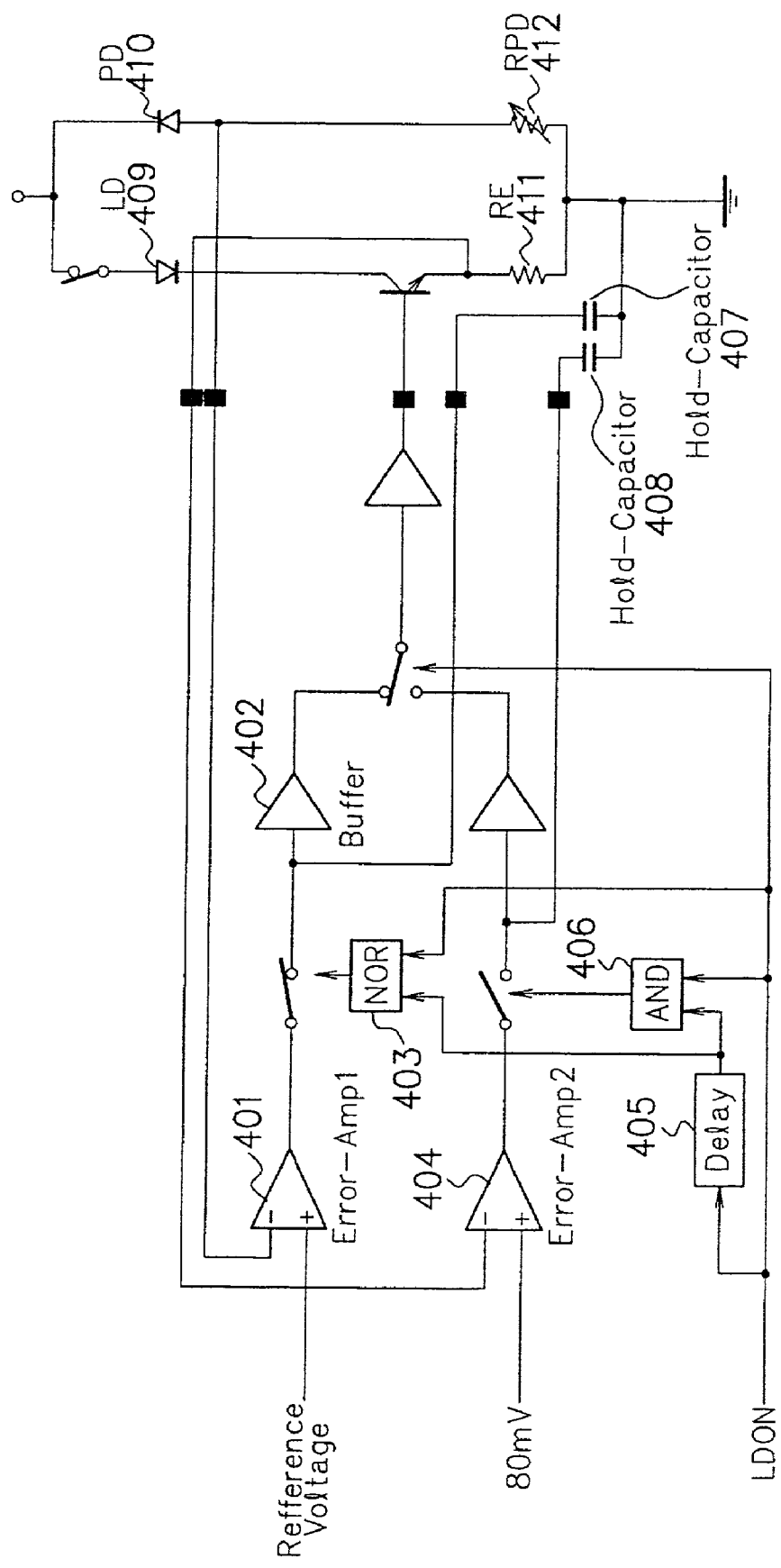
FIG. 17 is a circuit diagram of a circuit having an anode rendered to be common in a circuit structure in which the peak value of optical intensity and a bias current of a semiconductor laser.

FIG. 17 shows a circuit of a case in which an anode common semiconductor laser is used. In the circuit shown in FIG. 17, the semiconductor laser is connected to the collector of a transistor as compared with the circuit shown in FIG. 16. Thus, a circuit almost the same as the cathode common semiconductor laser can be realized. As a result, anode common and cathode common semiconductor lasers can be usable in the same IC.

Figure 18:
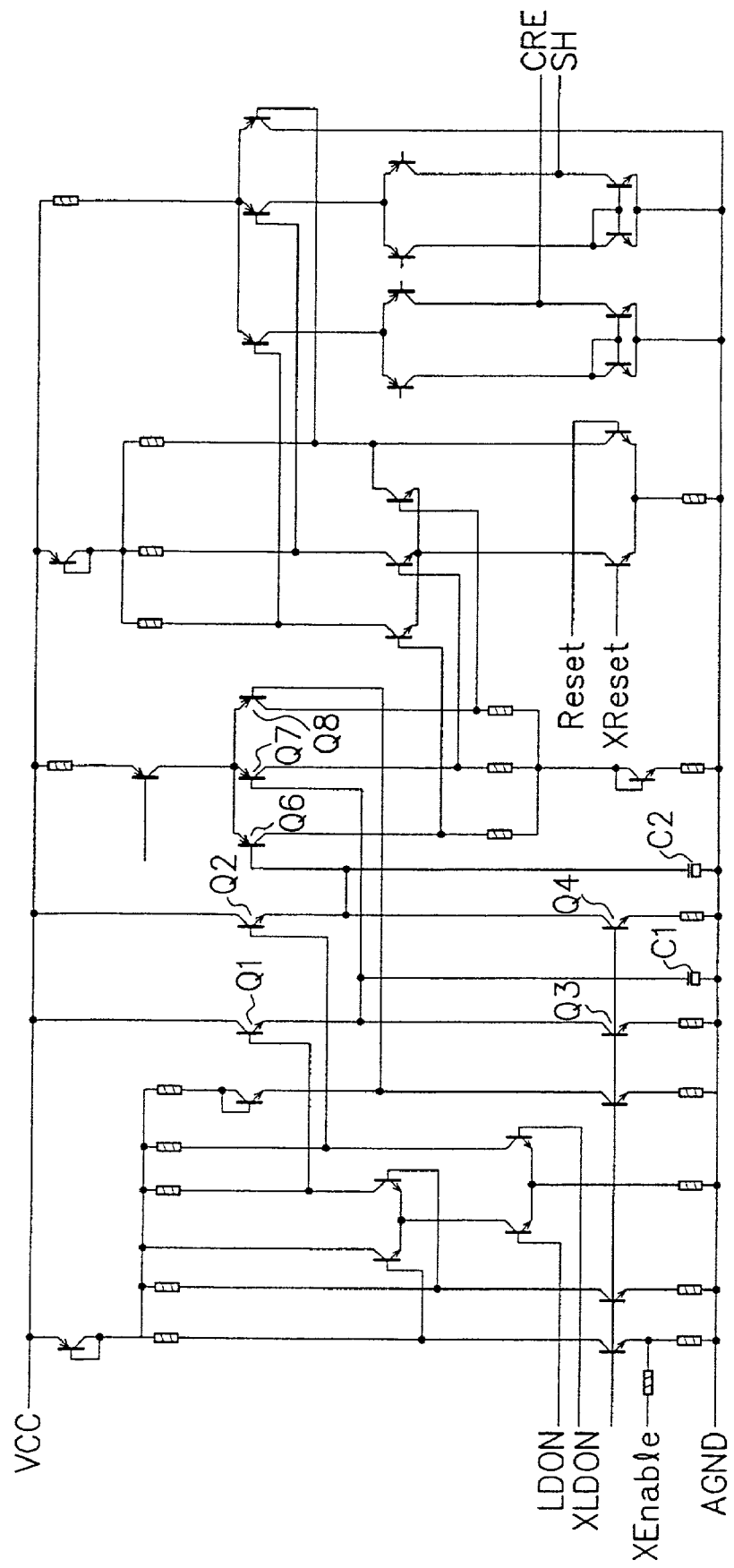
FIG. 18 is a circuit diagram of a circuit which sets up the timing which controls a semiconductor laser.

In the circuit shown in FIG. 18, in order to generate a timing for control the semiconductor laser, C1 is quick-charged when the LDON signal is high and the capacitor is discharged by a constant current when the LDON signal is low so as to a control is not performed when a thin pulse is input. By doing in this way, control accuracy is improved by holding a control value with respect to a narrow pulse sequence as compared with a structure of a simple delay circuit+a logic circuit.

Figure 19:
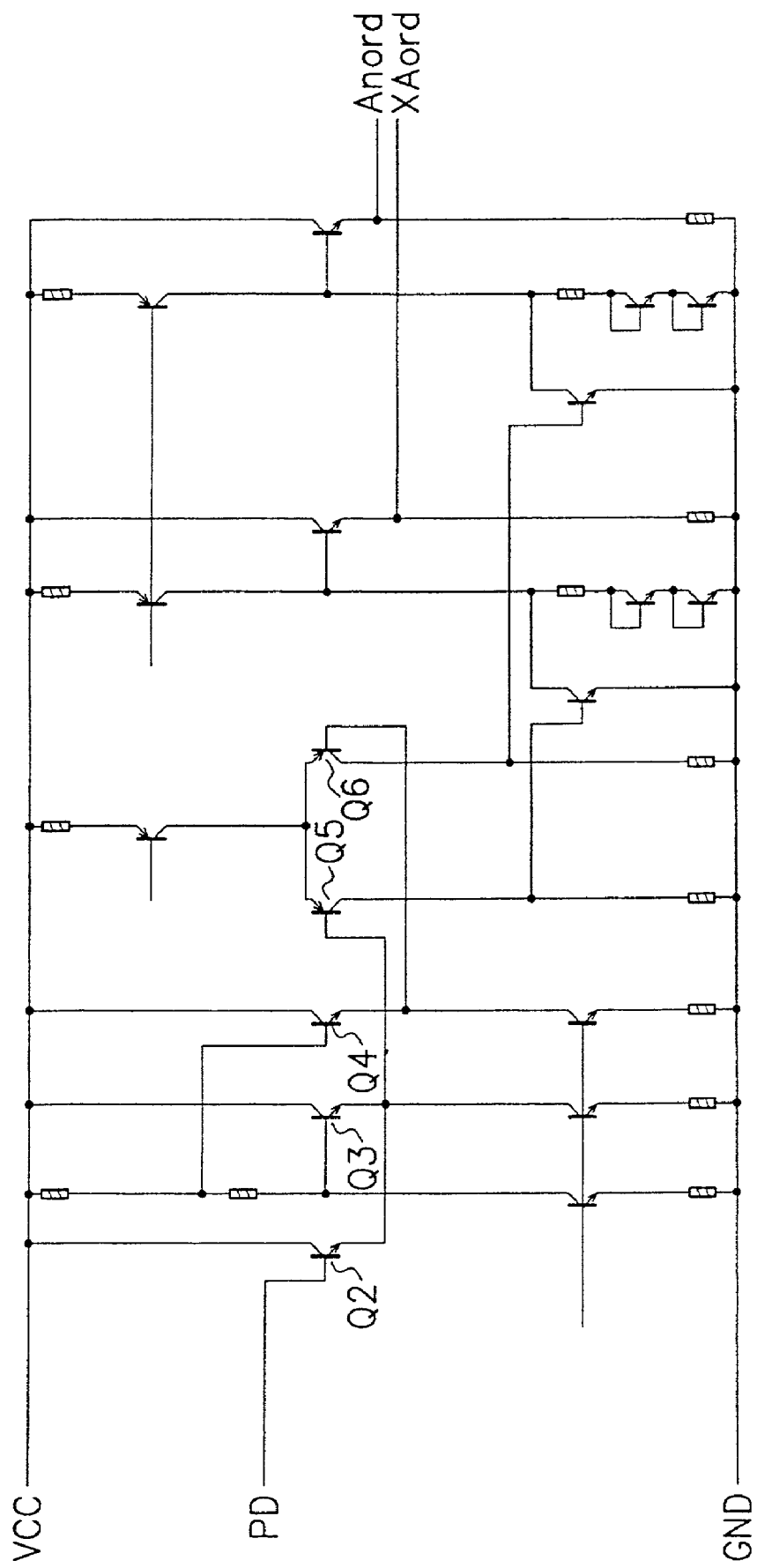
FIG. 19 is a circuit diagram of a circuit which sets up the timing which controls a semiconductor laser.

FIG. 19 is an example in which an anode common semiconductor laser is connected when a terminal voltage of the light-receiving element is equal to or less than VCC/2 or otherwise rendered to be a cathode common in a case in which the connection of the semiconductor laser as shown in FIG. 16 and FIG. 17 is performed. A characteristic of the terminal voltage of the light-receiving element detecting a light of the semiconductor laser being changed with a GND as a reference in a case of an anode common and being changed with a VCC as a reference in a case of a cathode common is used.

By doing in this way, it is distinguished automatically whether the anode common semiconductor laser is connected or the cathode common semiconductor laser is connected. Therefore, the control direction according to FIGS. 16 and 17 can be changed, and the same circuit (IC) can be used to both the anode common semiconductor laser and the cathode common semiconductor laser.

Figure 20:
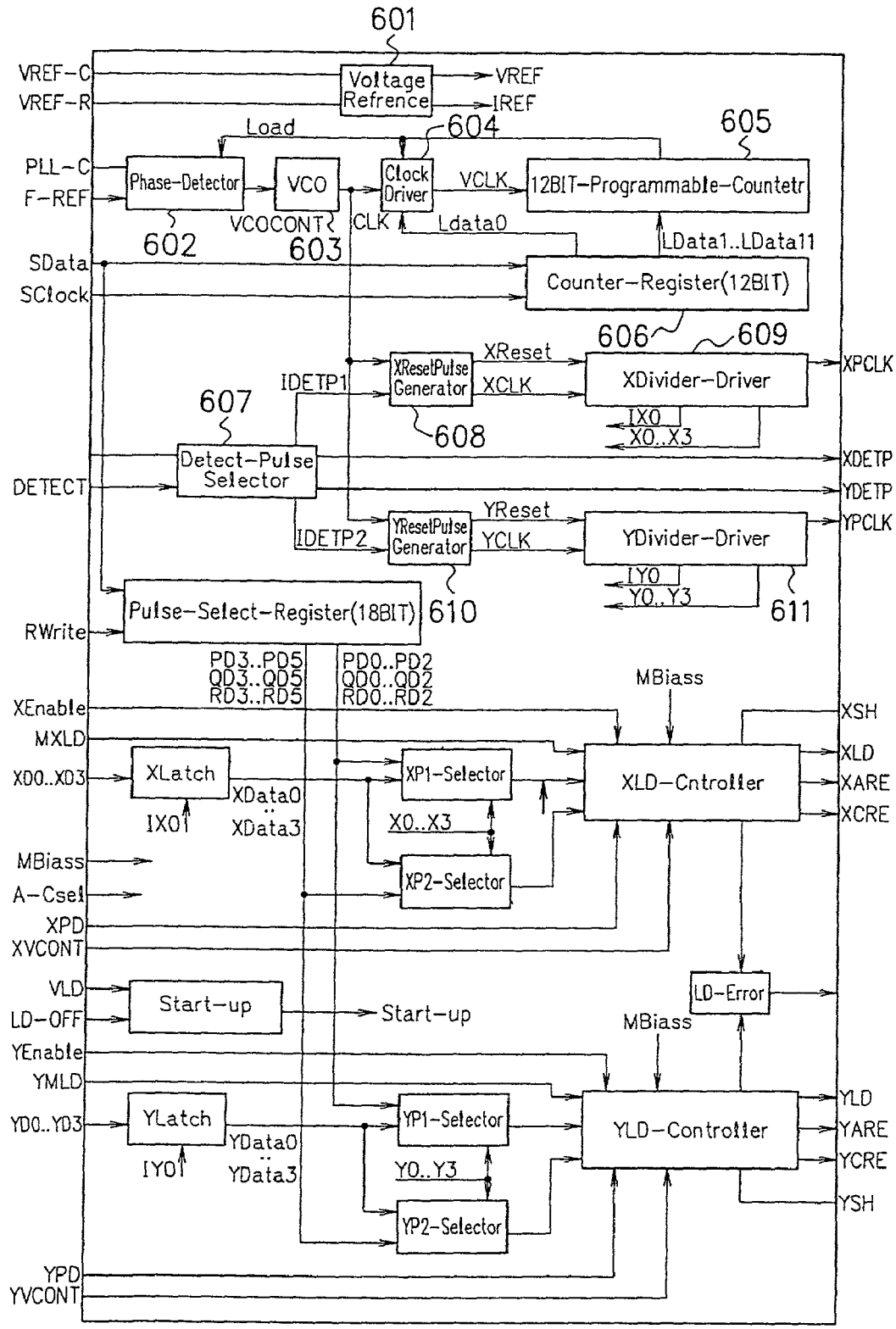
FIG. 20 a structural diagram of a chip in a case in which a circuit according to a first embodiment of the present invention is realized as a single chip IC.

FIG. 20 is a structural diagram of a chip when the above-mentioned circuit is realized as a single chip IC. In the present embodiment, the pixel clock frequency is the same frequency, the synchronous signal can be independently controlled by two kinds, and a circuit part for controlling and modulating the semiconductor laser has 2 channels.

A Voltage-Reference 601 is a reference power supply circuit of the entire IC, and supplies a reference power to other circuit blocks. A PLL-LOOP is constituted by a Phase-Detector 602, a VCO 603, a Clock-Driver 604 and a 12-BIT-Programmable-Counter 605. A lower order 1 BIT from among 12-BIT data set in a Counter-Register is set so as to delay the phase of an output clock VCLK of the Clock-Driver 604 by $\pi$, and higher order 11 bits set the dividing ratio of the 12-BIT-Programmable-Counter 605. Thus, the frequency of CLK is F-REF×N/2 (N: 12-BIT data).

Synchronizing with each of DETP1 and DETP2, an XResetPulse-Generator 608 and a YResetPulse-Generator 610 output XCLK and YCLK which has selected Xreset, Yreset or a reversal of CLK. According to XCLK, YCLK, Xreset and Yreset, an XDriver-Driver 609 and a YDriver-Driver 611 are quarter-divided, and output pixel clocks XPCLK and YPCLK which synchronized with XDEPT and YDEPT.

Figure 24:
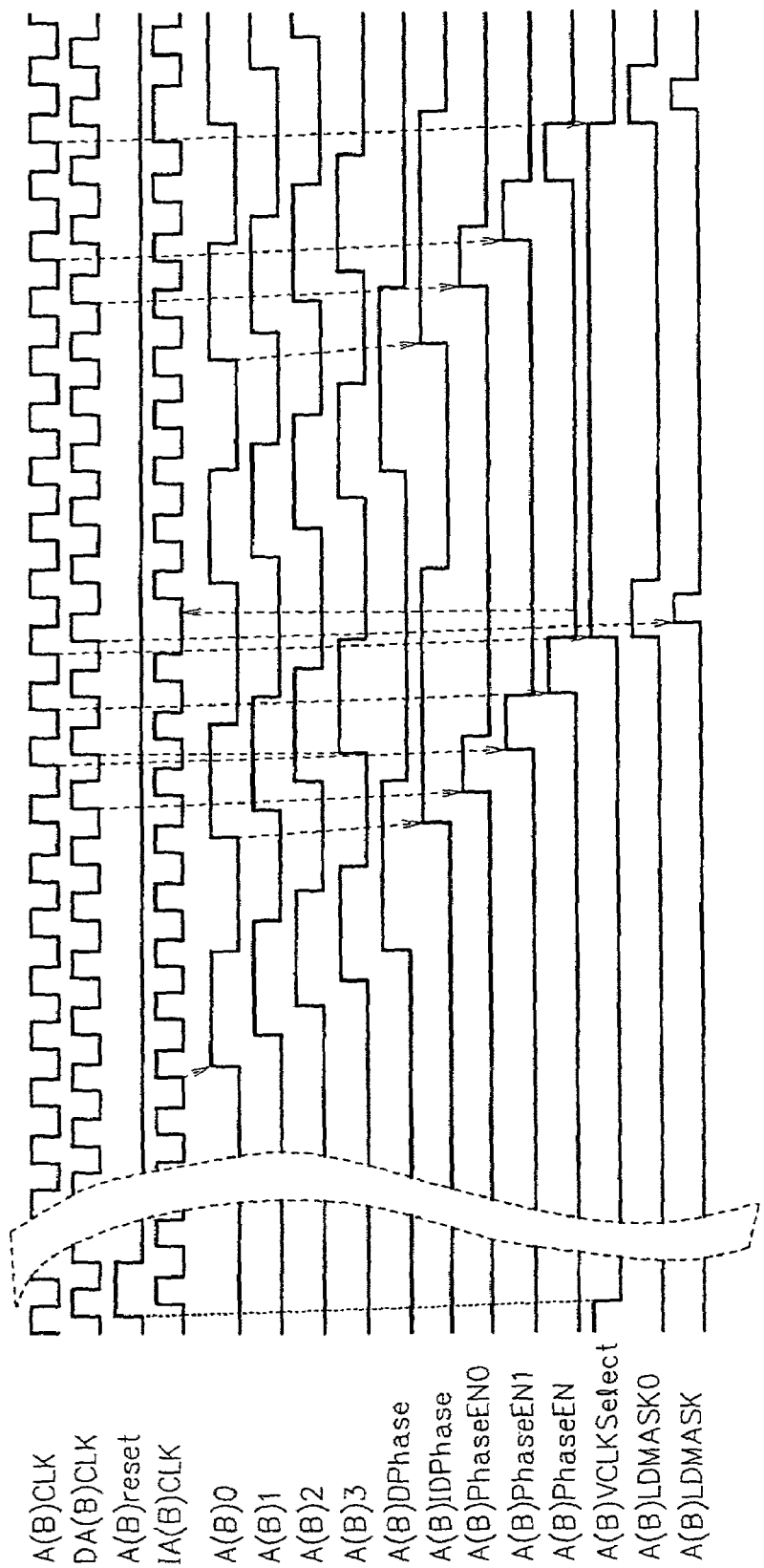
FIG. 24 a timing chart when a pixel clock is subjected to a ⅛ phase delay control.

According to a timing chart shown in FIG. 24, and according to the rising edge of XDPhase and YDPhase, the image clock can be delayed by ⅛ phase. Consequently, a delay control of the pixel clock start position can be carried out for every ⅛ clock cycle for every line scanning.

Moreover, the pixel clock frequency can be changed into FCLK×N/(N+M/8) in equivalent by giving a rising edge M times during the scanning of one line. Furthermore, as shown in the timing chart of FIG. 24, the pixel clock is delayed by ⅛ clock cycle by generating ALDMASK and BLKMASK signals, and forcibly turning off the semiconductor laser at the timing so that an image intensity is not rapidly changed. In this case, if ⅛ intensity is reduced previously, there is no need to make a forcible turn-off although an automatic turn-off is made.

Figure 21:
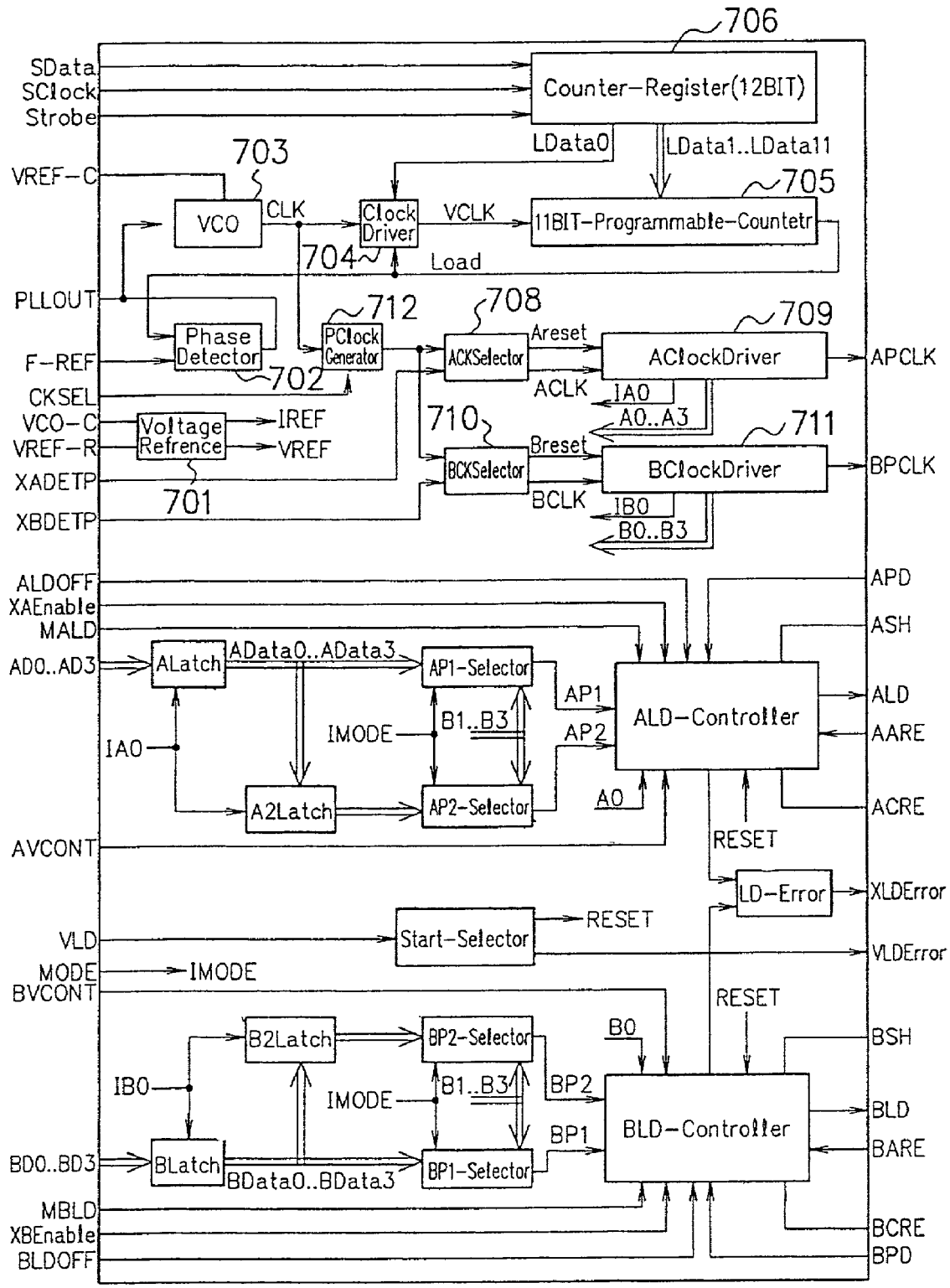
FIG. 21 is a structural diagram of a chip which is constituted so as to generate an optical modulation pulse according to a predetermined rule.

Thus, in a case in which ⅛ is reduced from the image data beforehand, a LDMASK signal is rendered to be ineffective by setting a MaskEN signal to high. In FIG. 21, a chip structure is shown in which an optical pulse is generated in accordance with a previously determined rule.

Figure 22:
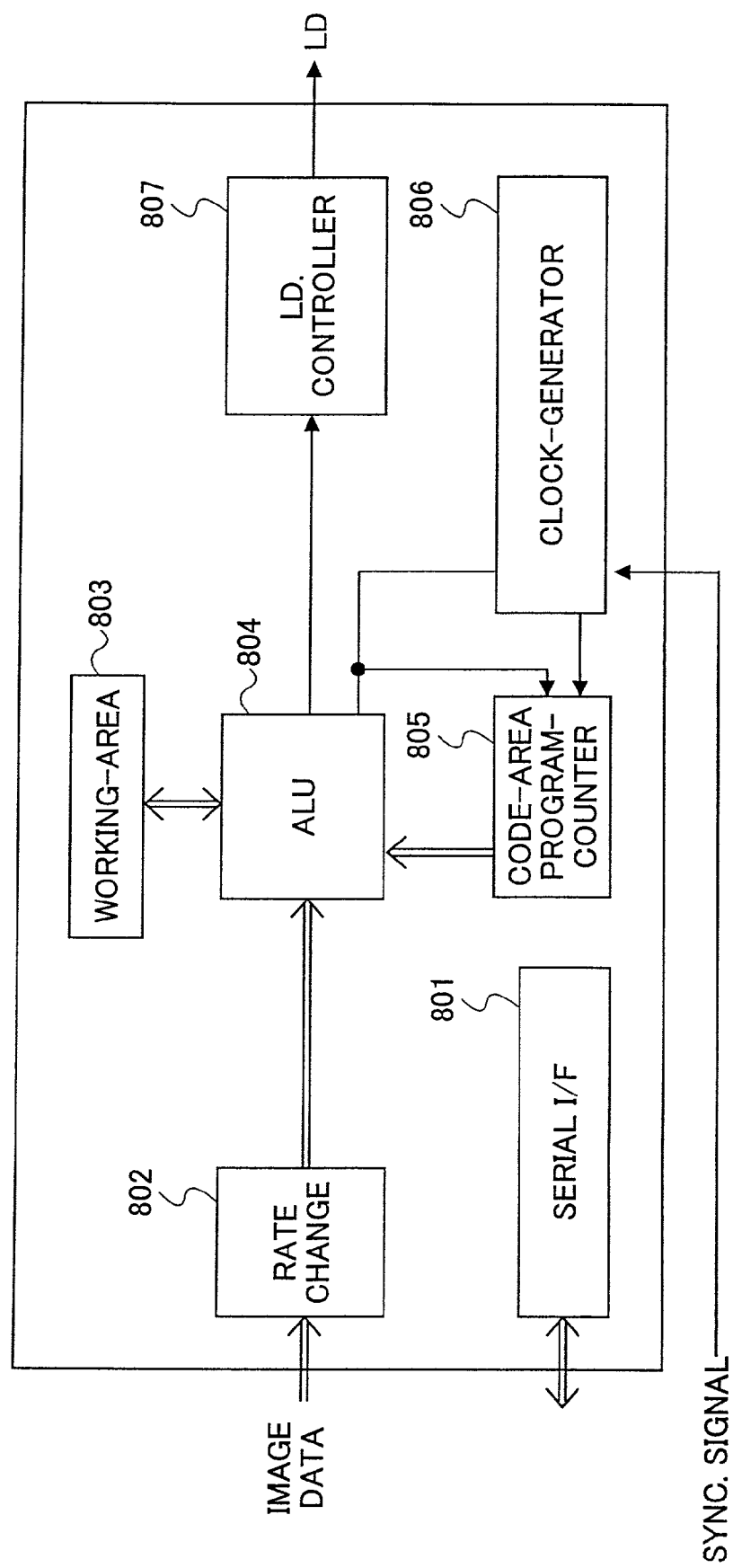
FIG. 22 is a block diagram of a circuit which carries out a n image data conversion process.

FIG. 22 is an example which realizes the above-mentioned matter by constituting a unit which performs a process for effective write-in period of image data, producing an intensity pattern for controlling an electronic photograph process, detecting isolated dots and a corresponding image data conversion process by writing program codes in a Code-Area-Program-Counter 805 by a serial I/F 801.

It should be noted that an ALU 804 performs an operation with an output clock (8 times the pixel clock) of the Clock-Generator 806. Moreover, the program code is controlled to become a predetermined program count value for every synchronized signal. As mentioned above, the ALU804, which performs a process in a case in which the transmitted image data is outputted, the LD-Controller 807 modulates the semiconductor laser according to the data. It should be noted that a rate conversion RAM 802 serves as a buffer memory for absorbing a difference in rate between a clock being transmitted and a write-in clock.

Figure 23:
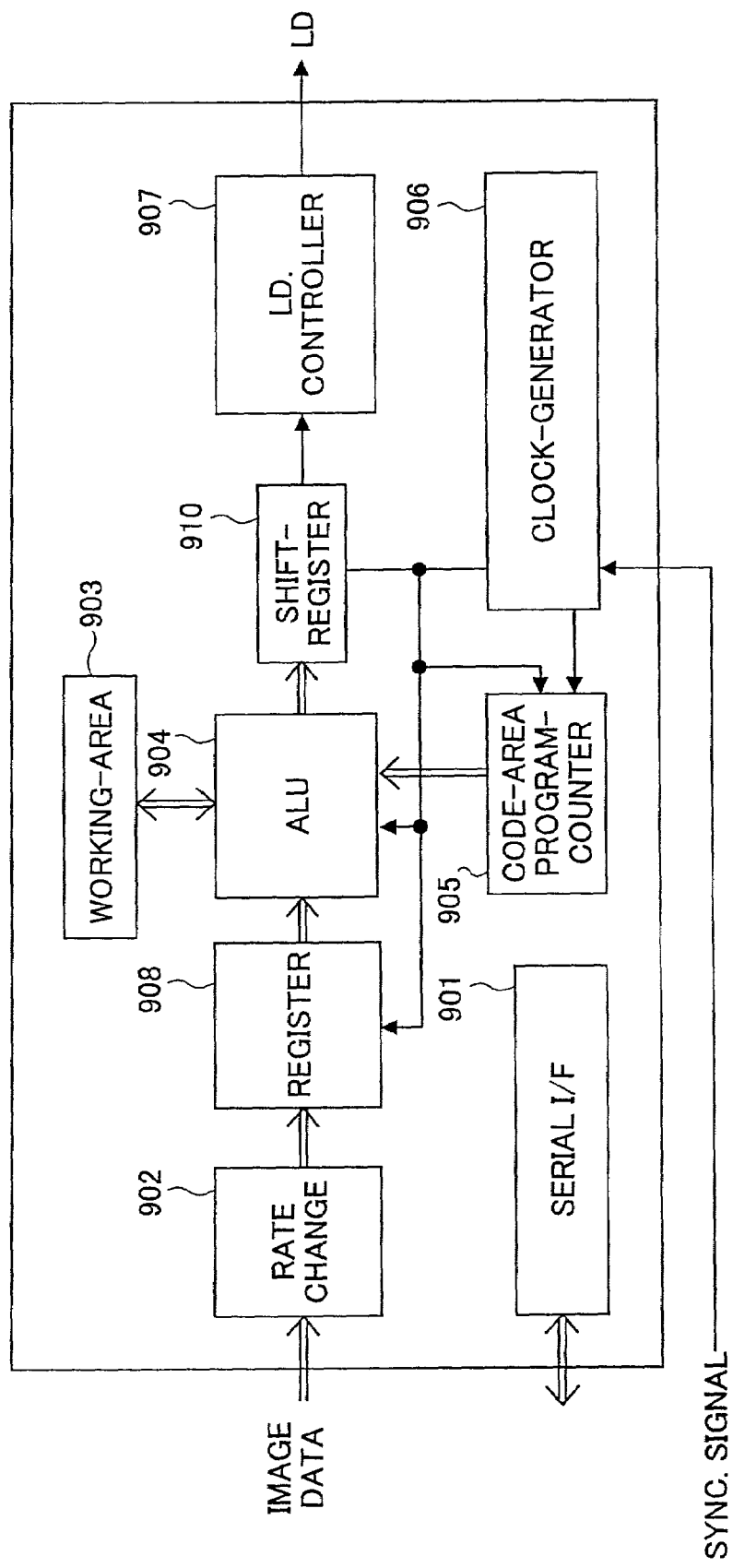
FIG. 23 is a block diagram of a circuit which carries out an image data conversion process.

In a circuit shown in FIG. 23, an ALU 904 writes a data pattern corresponding to optical modulation pattern data corresponding to a single pixel in a Shift-Register 910 once for each 8 cock cycle of a clock-Generator 906, and the Shift-Register 910 provides modulation data of an LD-controller 907 according to a clock generated by a Clock-Generator 906. It should be noted that parts that are the same as the parts shown in FIG. 22 are given reference numerals having the same lower two digits, and descriptions thereof will be omitted.

(Second Embodiment)

A description will now be given, with reference to FIGS. 25 through 39, of an image forming apparatus according to a second embodiment of the present invention. It should be noted that a part of the circuit provided in the image forming apparatus according to the second embodiment is equivalent to the circuit of the image forming apparatus according to the above-mentioned first embodiment. Such a circuit is explained by referring to figures described in relation with the first embodiment.

Figure 25:
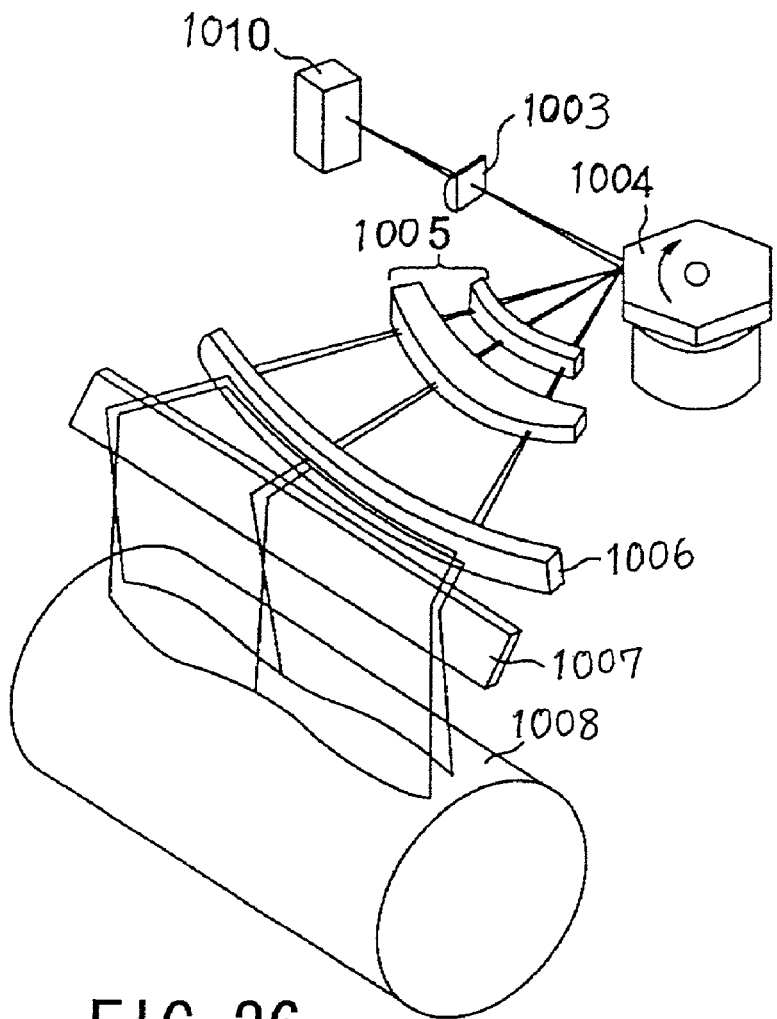
FIG. 25 is a perspective view of an optical scanning part provided in an image forming apparatus according to a second embodiment of the present invention.
Figure 26:
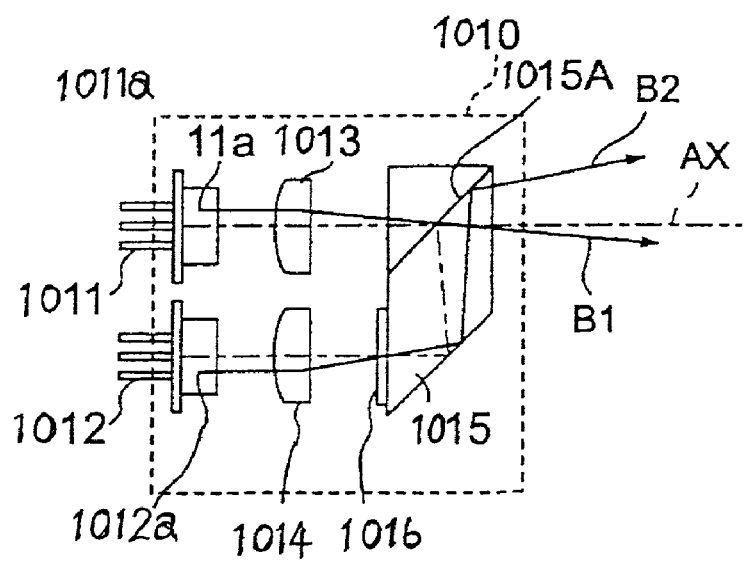
FIG. 26 is an illustration showing a light source device shown in FIG. 25.

FIG. 25 is a perspective view of an optical scanning part provided in an image forming apparatus according to a second embodiment of the present invention. FIG. 26 is an illustration showing a light source device shown in FIG. 25.

A light source device 1010 comprises, as shown in detail in FIG. 26, a light source part having a plurality of light-emitting parts 1011a and 1012a (two parts in this case) and coupling lenses 1013 and 1014 which carry out coupling of diverging light flux emitted by each of the light-emitting parts 1011a and 1012a. The coupling lenses 1013 and 1014 change the above-mentioned diverging light flux into "the light flux form (for example, a parallel light flux, slightly diverging light flux or convergent light flux, etc.) suitable for the subsequent optical system". As shown in FIG. 26, with the form of the present embodiment, each coupled light flux is projected from the light source device 1010 as "parallel light fluxes B1 and B2", and forms an image in a mostly linear shape which extends in the primary scanning direction main at a position adjacent to a deflecting reflection surface of a rotating polygon mirror 1004 which is the deflector by a cylindrical lens 1003 as a line image forming system.

The tow light fluxes pass the respective image forming lenses 1005, and 1006 while being deflected with an equiangular velocity in association with the equiangular velocity rotation of the rotating polygon mirror 1004; then the optical path is bent by an optical path folding mirror 1007; light fluxes are diverged as optical spots by the action of the lenses 1005 and 1006 on a photo conductor surface of the photo conductor 1008 which is a surface to be scanned, and the optical spots scan along two scanning lines on the surface to be scanned. The two optical spots are formed at a desired interval (scanning pitch) in the sub-scanning direction.

The relative positional relationship between the light-emitting parts of the light source part is decided so that the above-mentioned "desired scanning pitch" is achieved in accordance with a synthesized magnification M in the sub-scanning direction of the image forming system (in the present embodiment, the coupling lenses 1013 and 1014, the cylindrical lens 1004, the image forming lenses 1005 and 1006) between the light source part and the surface to be scanned.

Here, as shown in FIG. 26, the light source device 1010 carries out coupling of the diverging light fluxes from two semiconductor lasers 1011 and 1012 separately with the coupling lenses 1013 and 1014 corresponding to the respective semiconductor lasers so as to change into the parallel light fluxes, and synthesizes the coupled light fluxes by using a beam synthesizing prism 1015. The beam synthesizing prism 1015 has a polarization separation film 1015A, and the light flux from the coupling lens 1013 transmits the polarization separation film 1015A. Moreover, the plane of polarization of the light flux from the coupling lens 1014 is rotated by 90 degrees from the original state by a ½-wavelength plate 1016, and the light flux is reflected sequentially by the prism surface and the polarization separation film 1015A and is projected from the beam synthesizing prism 1015.

The optical axes (shown by chain lines) of the coupling lenses 1013 and 1014 are mutually parallel, and are synthesized into a single line after passing the beam synthesizing prism 1015 as shown in the figure so as to be a synthesized optical axis AX. The vertical direction of FIG. 26 corresponds to the sub-scanning direction. The light-emitting parts 1011a and 1012a of the semiconductor lasers 1011 and 1012 are shifted in the sub-scanning direction (opposite to each other) with respect to the optical axis of the respective coupling lenses 1013 and 1014, and, thus, light fluxes B1 and B2 which are synthesized by the beam synthesizing prism 1015 mutually form an angle in the sub-scanning direction.

The light source part is not limited to that shown in FIG. 26, and a well-known proper one may be used. For example, structure may be made so that "a semiconductor laser array with a plurality of light-emitting parts arranged in an array in monolithic" is used and a plurality of diverging light fluxes projected from the light-emitting arts are coupled by a common coupling lens.

Figure 27A:
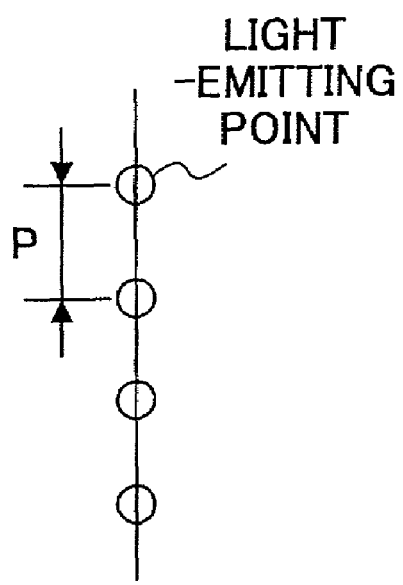
FIG. 27A is an illustration showing a plurality of light-emitting points provided in the light source.
Figure 27B:
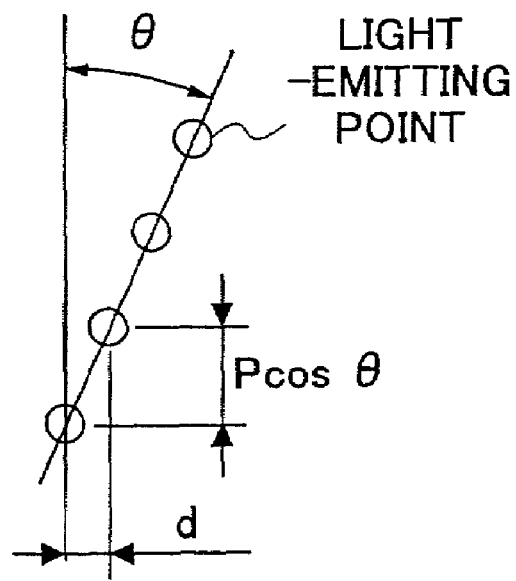
FIG. 27B is an illustration of a case in which the plurality of light-emitting points are slantingly arranged.

There is a limit (14 μm) in reducing the light-emitting point interval of a semiconductor laser array due to the influence of a thermal cross-talk or an electric cross-talk. Moreover, it becomes a demerit in cost to make many kinds of light-emitting point intervals of a semiconductor laser array. However, various scanning optical systems have been developed with the write-in density and scanning width, and there are various magnifications of the scanning optical systems. Therefore, in order to obtain arbitrary scanning pitches on a surface to be scanned, the semiconductor laser array is slantingly used as the pitch in the sub-scanning direction is apparently turned into a desired pitch. As shown in FIG. 27B (this example is a semiconductor laser array having 4 light-emitting points), the pitch becomes equivalent to P cos θ in the sub-scanning direction, by slanting the semiconductor laser array having the light-emitting point interval P by an angle θ. Accordingly, the scanning pitch in the sub-scanning direction can be made into an arbitrarily desired pitch.

However, when a semiconductor laser array is slanted, the light-emitting point of the primary scanning direction are shifted by a distance d as shown in FIG. 27B, and the scanning start position of the light flux emitted from each light-emitting points on the surface to be scanned is also shifted. In such a case, an amount of shift on the surface to be scanned is multiplied by the magnification of the entire optical system in the primary scanning direction. Additionally, even when the semiconductor laser array is not slanted as shown in FIG. 27A, the scanning start position on the surface to be scanned is shifted in a similar manner as mentioned above due to by the shift of position of the light-emitting point which occurs due to a machining error in the manufacturing process of the semiconductor laser array. As mentioned above, since the shift of the position of the light-emitting point in the main scanning direction becomes a cause of degradation of final image quality, the scanning start position is needed to be corrected.

Figure 28:
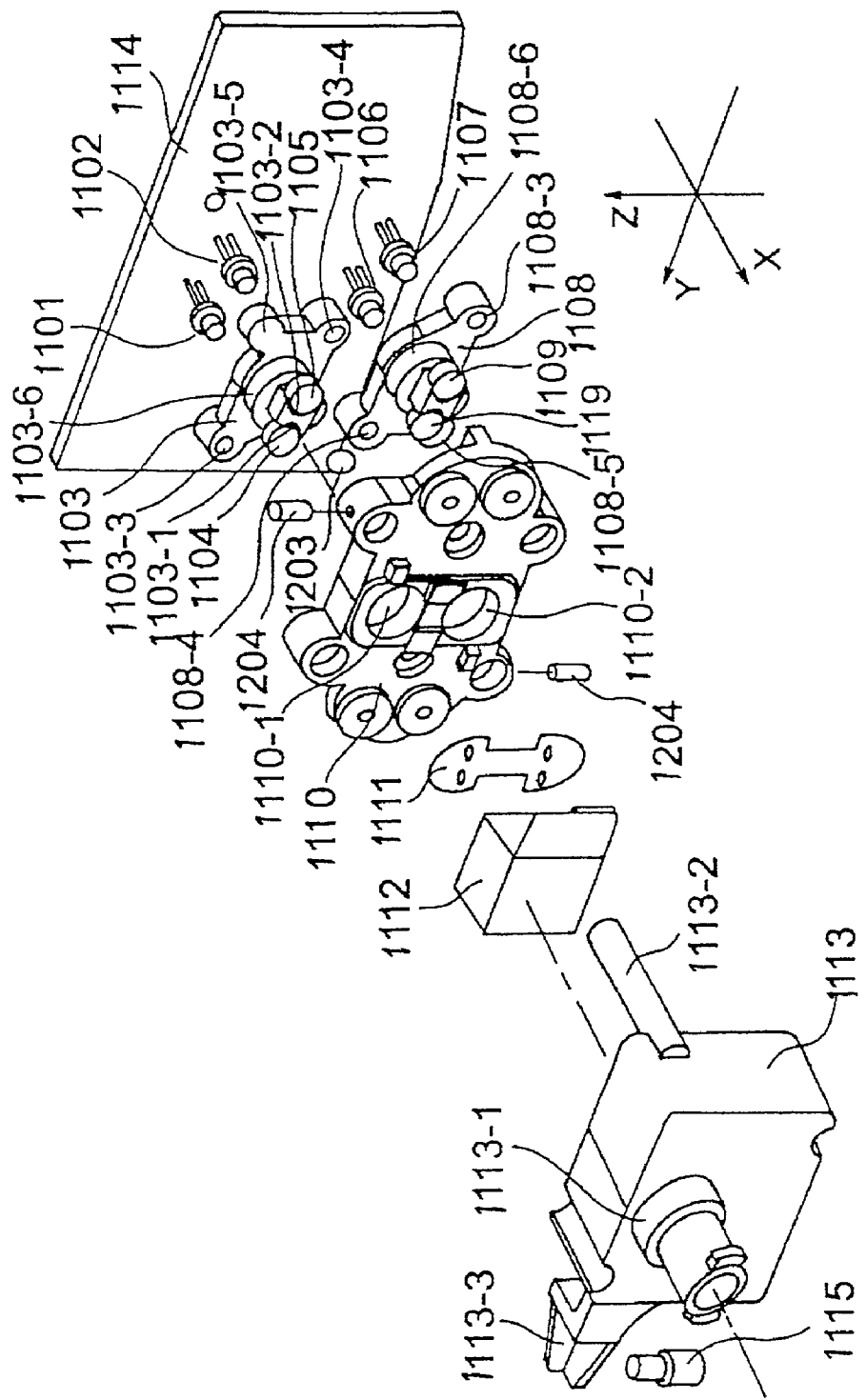
FIG. 28 is a perspective view of a 4-beam light source unit.

FIG. 28 is a perspective view of 4-beam light source unit using a total of four general-purpose semiconductor lasers. In FIG. 28, semiconductor lasers 1101 and 1102 are respectively pressed fit in fitting holes (not shown in the figure) which are arranged at an interval of about 8 mm in the primary scanning direction on the back side of an aluminum die cast support member 1103, and are arranged along a line in symmetric with a first projection axis. Additionally, the collimate lenses 1104 and 1105 constitute a first light source part by being fixed by a UV cure adhesive filled in a gap between U-shaped support parts 1103-1 and 1103-2 making pairs with semiconductor lasers 1101 and 1102, the X positions being determined so that the diverging light flux of each semiconductor laser is changed to a parallel light flux and the Y and Z positions are aligned so that predetermined beam projection direction is achieved. Similarly, a second light source part is also constituted by semiconductor lasers 1106 and 1107 being pressed fit into the support member 1108 and collimate lenses 1119 and 1109 being fixed to support member 1108.

The first and second light source parts are arranged symmetrically with X axis; the cylinder parts 1103-6 and 1108-6, of which projection axes (first and second projection axes) are aligned with the centers thereof, are brought into engagement with fitting holes 1110-1, 1110-2 from the back side of the base member 1110; contact is made by using each three points of the positioning parts 1103-3, 1103-4 and 1103-5 and 1108-3, 1108-4 and 1108-5 as references; the support member 1103 is fix by screws piercing from the front side of the base member in the positioning parts 1103-3, 1103-4, 1108-3 and 1108-4.

A board 1111 to which an aperture corresponding to each semiconductor laser is provided and a bean synthesizing prism 1112, which projects the beams of the semiconductor lasers 1106 and 1107 by being close to the two optical axes of the semiconductor lasers 1101 and 1102, are supported on the base member. The thus constructed base member is supported by a holder member 1113, and the base member is mounted to an optical housing (not shown in the figure) accommodating a scanning optical means by aligning the center of a cylindrical part 1113-1 with an optical axis of the scanning optical means so that a plurality of beams are incident on the scanning optical means. Moreover, the base member is rotatably supported about a cylindrical member 1113-1 as a center by moving a lever 1113-3 up and down by an adjusting screw 1115.

Although an inclination of a scanning line arises due to an arrangement error of a scanning optical system, the beam arrangement can be slanted to align with the scanning line. A substrate 114 in which the drive circuit of each semiconductor laser is formed is fixed to a support 1113-2, and leads of the semiconductor lasers are connected by soldering.

In the above-mentioned light source apparatus which has a plurality of light-emitting parts, since the wavelengths of the light-emitting parts are different from each other, the magnification of each scanning light, which scans the surface to be scanned, varies due to color aberration of the image forming lenses shown in FIG. 25, and a phenomenon occurs that the exposure width varies. Additionally, similar to the case in which a semiconductor laser array is slanted, as apparent from FIG. 28, positions of the light-emitting points are shifted in the primary scanning direction, and, thereby, the scanning start position of the light flux emitted by each light-emitting point on the surface to be scanned is also shifted. As well as the case where a semiconductor laser array is slanted, the shift of the scanning start position in the primary scanning direction becomes a cause of degradation of final image quality, a scanning start position must be corrected.

The position of the above-mentioned light-emitting point can be put in other words that "a case where the relative position of each light-emitting point of the semiconductor laser relative to the axis perpendicular to the deflecting scanning flat surface (a primary scanning plane) is different". In a case of such a state, that is, in a case in which there is no relative position of each light-emitting pint on the axis perpendicular to the deflecting scanning flat surface, the scanning start position of the optical spot on the surface to be scanned is a position shifted in the primary scanning direction, resulting in an image having a "zigzag" write edge.

As explained, referring to FIG. 3 through FIG. 6 in the above-mentioned first embodiment, by carrying out exposure by optical pulses according to the present invention, a steep exposure energy distribution can be obtained which is close to a cane in which the optical beam diameter is reduced by abut 20%. By doing in this way, since the same surface potential distribution as the case where a photo conductor surface potential distribution makes the diameter of a beam thinner is obtained, an image having good graininess (S/N ratio) can be obtained.

In the present embodiment, the pulse modulation unit (Pulse-Modulation-Unit) for generating an optical modulation pulse sequence is equivalent to the circuit shown in FIG. 7 in the above-mentioned first embodiment, and the explanation thereof will be omitted. Moreover, since LD control unit and the LD peripheral circuit for controlling and modulating semiconductor lasers are also equivalent to the circuit shown in FIG. 10, and the explanation thereof will be omitted.

Here, in the pulse modulation unit shown in FIG. 7, although the composition, which generates the high-frequency clock VCLK of which frequency is 8 times the pixel clock CLK from the pixel clock CLK, is shown, the pixel clock CLK itself is usually generated from a reference clock. When a semiconductor laser LD is used as a light source, since the exposure (scan) position shift occurs due to color aberration (so-called color aberration of magnification) of an optical scanning system by an oscillation wavelength jump, a difference in wavelength between a plurality of light-emitting parts or a color aberration of an optical scanning system, a pixel clock generating circuit which can finely control the pixel clock is required.

For example, when the number of pixels of one scan is 14,000, the frequency of the pixel clock is 60 MHz and pixel position accuracy at opposite ends of scan is ½ of a pixel width, in order to enable such a frequency setting by a single PLL, it must be set to 60 MHz/(14000×4)=1.07 kHz, and PLL must be controlled by a reference clock of about 1 kHz. As a result, an amount of phase change can be detected at only for every 1 kHz, and the control bandwidth as a PLL is decreased. Furthermore, it becomes weak to the external disturbance etc., and in order to improve pixel position accuracy, the demand for the stability of VCO 1203 which constitutes the PLL becomes very high. Although there is a method of double PLL so as to avoid the above-mentioned problem, jitter of the PLL circuit is accumulated doubly which causes an increase in enlargement of jitter. Additionally, a cost is relatively increased.

Figure 29:
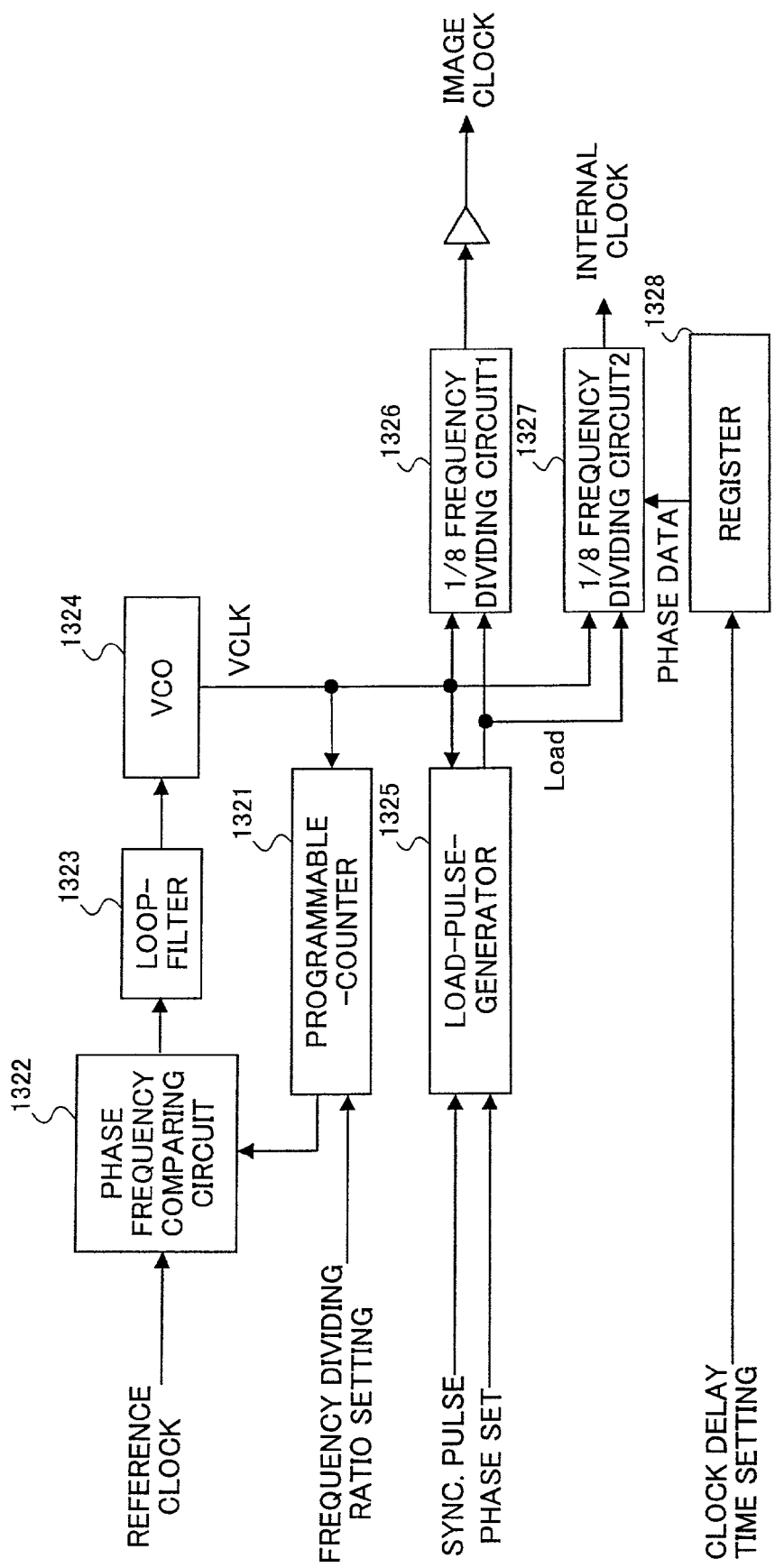
FIG. 29 is a circuit diagram of a circuit which performs VCLK signal generation and pixel clock generation.

FIG. 29 shows a circuit which solves the above-mentioned problem and realizes VCLK signal generation and pixel clock generation at the same time. A description will now be given below, with reference to FIG. 29, of an operation. In the circuit shown in FIG. 29, the VCLK signal is generated by a PLL loop PLL comprising: a phase frequency comparison circuit 1322 which compares a reference clock and a result of N division of the VCLK signal by a programmable counter 1321; a loop filter 1323 which filters a result of the phase frequency comparison circuit 1322; and a VCO 1324 of which oscillation frequency changes in response to an output voltage of the loop filter 1323. Additionally, the dividing ratio N of the programmable counter 1321 is set by an external frequency dividing ratio setting.

Thus, the VCLK signal is generated, and the pixel clock synchronous with a phase synchronous pulse is generated at a frequency of ⅛ of the VCLK signal by loading data=0 from a load pulse generator 1325 to a ⅛ frequency dividing circuit by the VCLK signal and the phase synchronous signal.

This circuit also has a ⅛ frequency dividing circuit 1327 which generates an internal clock having a phase difference between the pixel clock when preset phase data is loaded from a register 1325 at a similar timing. The ⅛ frequency dividing circuit 1327 is not needed when the pixel clock is slow. Additionally, The ⅛ frequency dividing circuit 1327 is not needed if a time delay of transmission of image data does not cause a problem.

However, it becomes impossible to take in data correctly when the frequency of the pixel clock is high since the time delay from output of the pixel clock to input of the image data causes a problem. In such a case, it can be avoided by making a phase of an image data take-in clock variable with respect to the output pixel clock based on preset phase data as is in the present embodiment.

Furthermore, in the present embodiment, the count (frequency dividing) of the ⅛ frequency dividing circuits 1326 and 1327 can be enabled/disabled by a Phase-Set signal. In the case of the present embodiment, a rising edge of the Phase-Set signal is caught by VCLK so as to stop a counting (frequency dividing) operation for one clock cycle of VCLK. Consequently, the phase of the pixel clock and the internal clock can be delayed by ⅛ clock unit. By performing phase delay of ⅛ clock cycle at a predetermined interval (or close to a predetermined interval) during one scanning period, the frequency of the pixel clock during one scanning period can be finely controlled in an equivalent manner. This is equivalent to an ability to more finely set the frequency variable step, which can be set by PLL-LOOP.

Figure 30:
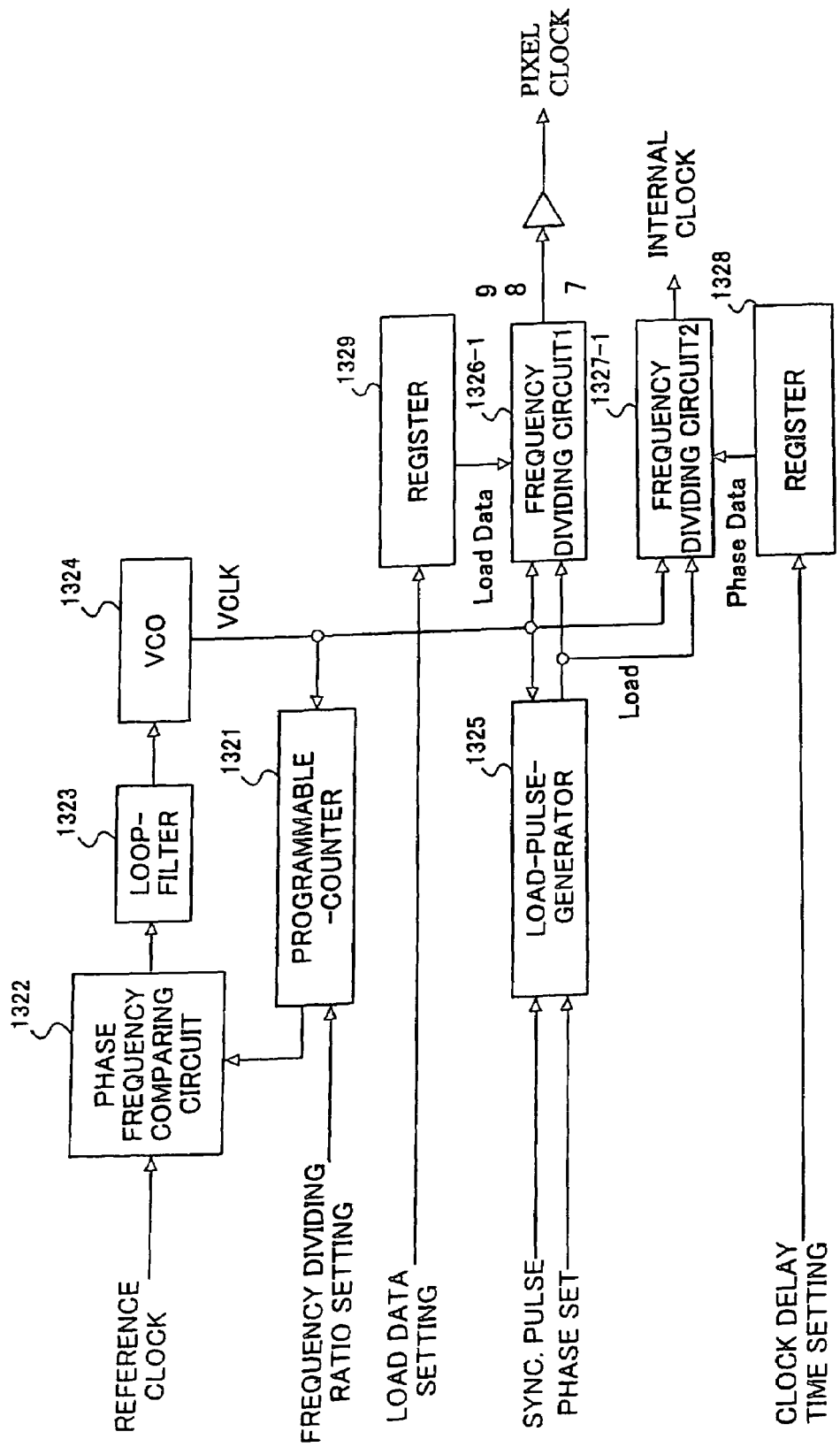
FIG. 30 is a circuit diagram of a circuit which performs VCLK signal generation and pixel clock generation according to the present invention.

Furthermore, when advancing by ⅛ clock, fine control can be achieved by reducing by ⅛ clock by loading data=1 instead of loading data=0 so as to change as frequency=8→7, as shown in FIG. 30. At this time, if load data is set, the data is output from register 1329 to the frequency dividing circuit 1326-1, and when the frequency dividing number=7 is output, it is shortened, and when the frequency dividing number=9 is output, it is prolonged.

In another method, a desired image can be obtained by performing a fine control by setting the original pixel clock to be relatively shorter, and delaying the phase of the pixel clock and the internal clock by ⅛ clock unit at a predetermined interval (or close to a predetermined interval) during one scanning period.

In a case of a multi-beam optical system in which the light-emitting part of the semiconductor laser LD is constituted by a plurality of light-emitting parts, if each oscillation wavelength is different, a cause of image degradation is generated since a difference is generated in the scanning width of the scanning light by each light-emitting part by color aberration of a scanning optical system for scanning and forming an image on the surface to be scanned, which causes a shift of image position for each scanning line or an intensity fluctuation in a highlight part.

The difference of the scan width can be corrected by using the above-mentioned phase shift, and writing can be performed at a desired target writing position. A shift may be made to shorten the scan width which will be prolonged, and a shift may be made to prolong the scan width which will be shortened. On the other hand, when the original image clock is compressed beforehand so as to be relatively short, an amount of shift may be changed for each of the light-emitting parts of which scan width is prolonged and the light-emitting parts of which scan width is shortened.

Here, when a semiconductor laser array is slanted, as stated also above, the light-emitting point position is shifted by a distance d in the primary scanning direction, and, thereby, the scanning start position off the light flux emitted by each light-emitting point on the surface to be scanned is also shifted. In such a case, an amount shift is multiplied by a magnification of the entire optical system in the primary scanning direction on the surface to be scanned.

FIG. 31 shows the shift, that is, a relationship between an interval of a plurality of light-emitting points on the primary scanning cross-section an interval of a plurality of optical spots on the surface to be scanned. FIG. 31 illustrates a state in which light fluxes emitted with the interval d is scanned with an interval d' due to a magnification relationship according to a ratio of focal distances of the coupling lenses 1013 and 1014 and the image forming lenses 1005 and 1006. The scanning light flux scans the surface to be scanned as an optical spot by a light condensing action by the image forming lenses 1005 and 1006. Accordingly, each optical spot scans with the distance d shifted in the primary scanning direction, and supposing that the magnification of the entire optical system is βm, the following relationship can be established.

$$|d'| = |\beta m \times d|$$

On the other hand, when it is not slanted, similar to the above mentioned, the scanning position shifts on the surface to be scanned due to the position shift of the light-emitting point generated by a machining error during the manufacturing process of the semiconductor array.

Moreover, similar to the case in which the semiconductor laser is slanted, when the light source part is constituted by a plurality of semiconductor lasers, the scanning start position of the light flux emitted by each light-emitting point shifts on the surface to be scanned since the position of the light-emitting point is shifted in the primary scanning direction. As well as the case where a semiconductor laser array is slanted, the shift of the scanning start position in the primary scanning direction becomes a cause of degradation of final image quality, a scanning start position must be corrected.

The position of the above-mentioned light-emitting point can be put in other words that a case where the relative position of each light-emitting point of the semiconductor laser relative to the axis perpendicular to the deflecting scanning flat surface (a primary scanning plane) is different. In a case of such a state, that is, in a case in which there is no relative position of each light-emitting pint on the axis perpendicular to the deflecting scanning flat surface, the scanning start position of the optical spot on the surface to be scanned is a position shifted in the primary scanning direction, resulting in an image having a zigzag write edge.

Figure 32:
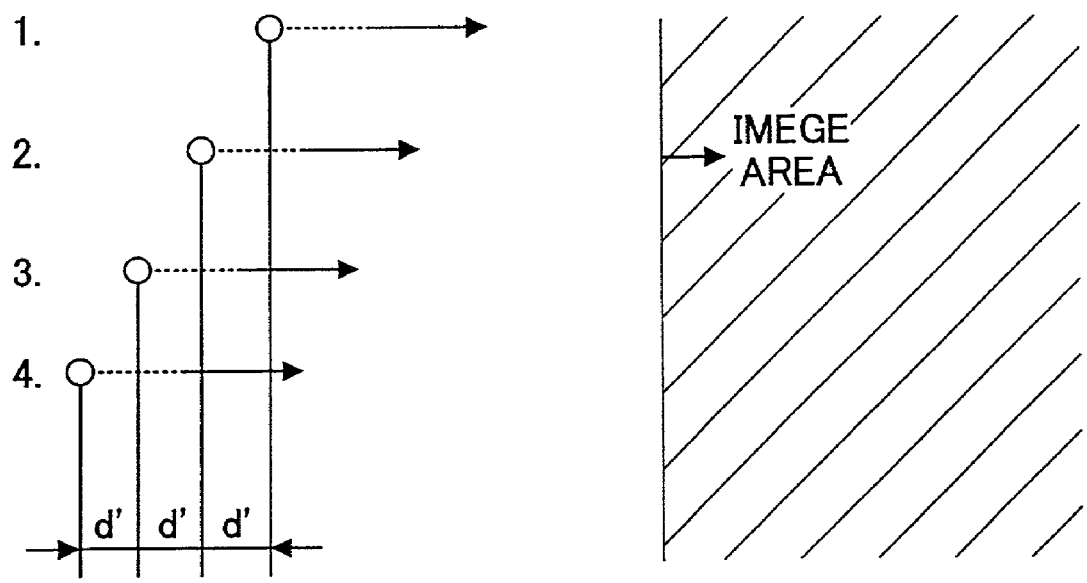
FIG. 32 is an illustration for explaining the plurality of light-emitting points and a write start position thereof.

FIG. 32 illustratively shows scanning of the optical spots on the surface to be scanned. By slanting the semiconductor laser array, the optical spots which scans on the surface to be scanned with an interval d'. At this time, after a predetermined time, an electrostatic latent image is formed on the surface to be scanned by emitting a light by the semiconductor laser array in response to an image modulation signal based on a detection signal from a synchronous detection optical system (scanning light detection means) arranged preceding to the image area. The semiconductor laser array also takes timing for other light-emitting points on the basis of the light flux which crosses the synchronous detection optical system first. Therefore, with this, the write-in start position of the optical spot by each light-emitting point shifts in the image area, and causes image degradation.

Then, the start position of the electrostatic latent image formed on the surface to be scanned scan can be aligned by delaying by shifting a phase so as to start writing image information at a timing at which the light flux, which writes in the image area at last, reaches the image area. If d' is the length of N/8 clock, in the case of the semiconductor laser array having four light-emitting points as shown in FIG. 32, the control signal corresponding to the scanning light preceded most can be aligned with the last one by shifting 3×N/8 clock. Similarly, the second one be shifted 2×N/8 clock, and the third one be shifted N/8 clock.

Although the last scanning light is made as a reference in the above-mentioned example, any point may be made as a reference. In such as case, the shift can be made so as to arbitrarily shortened or elongated. As in the manner mentioned above, even when the semiconductor laser array is slanted, the starting end of an image can be aligned.

In a case in which it is desired to finely set the frequency variable step of PLL-LOOP finely set, such setting can be carried out by expanding the frequency dividing setting range of the programmable counter 1321 shown in FIG. 30 and lowering the reference clock or raising the VCLK signal. However, lowering the reference clock results in that the frequency fluctuation of the VCLK signal can be detected only at the reference clock cycle, and stabilization of the VCO 1324 becomes a large technical subject.

For example, when the number of pixels of one scan is 14,000, the frequency of the pixel clock is 60 MHz and pixel position accuracy at opposite ends of scan is ½ of a pixel width, in order to enable such a frequency setting by a single PLL, it must be set to 60 MHz/(14000×4)=1.07 kHz, and PLL must be controlled by a reference clock of about 1 kHz. As a result, an amount of phase change can be detected at only for every 1 kHz, and the control bandwidth as a PLL is decreased. Furthermore, it becomes weak to the external disturbance etc., and in order to improve pixel position accuracy, the demand for the stability of VCO 1324 which constitutes the PLL becomes very high. Although there is a method of double PLL so as to avoid the above-mentioned problem, jitter of the PLL circuit is accumulated doubly which causes an increase in enlargement of jitter. Additionally, a cost is relatively increased. On the other hand, in order to raise VCLK, the oscillation frequency of the VCO 1324 must be raised, which also results in a technical subject.

However, according to the present invention, if VCO 1324 can be made high, a frequency setup can be attained at a step exceeding it, and if VCO 1324 can be stabilized, a frequency setup will be attained at a step exceeding it. Moreover, the discontinuity of the amount of exposure energy can be canceled by being made not to emit a light by a semiconductor laser during ⅛ clock cycle during which the phase delay is generated by the Phase-Set signal.

Additionally, the Phase-Set signal may be set when the semiconductor laser does not emit light. The Phase-set signal may be set in the position shifted for each scanning. Setting may be carried out only at the first line of a page. Further, when a power is supplied to the apparatus, a predetermined time interval may be set. The time interval may be measured by incorporating an internal clock in the apparatus, or may be measured by a method of time counter.

By changing the amount of phase delay at such timing, the phase of the pixel clock can be changed without influencing the output image. Moreover, the position of each pixel can be controlled for every ⅛ clock cycle by changing the Phase-Set signal so that only the start timing is increased or decreased at a constant unit for each scanning (for example, ⅛→⅔→⅜→⅘→⅝→⅞→⅞→0).

By doing this way, a high-definition image can be obtained by finely controlling a screen angle of an image output. Additionally, by arbitrarily changing the timing of setting of the phase change circuit, it can be dealt with various cases.

Figure 33:
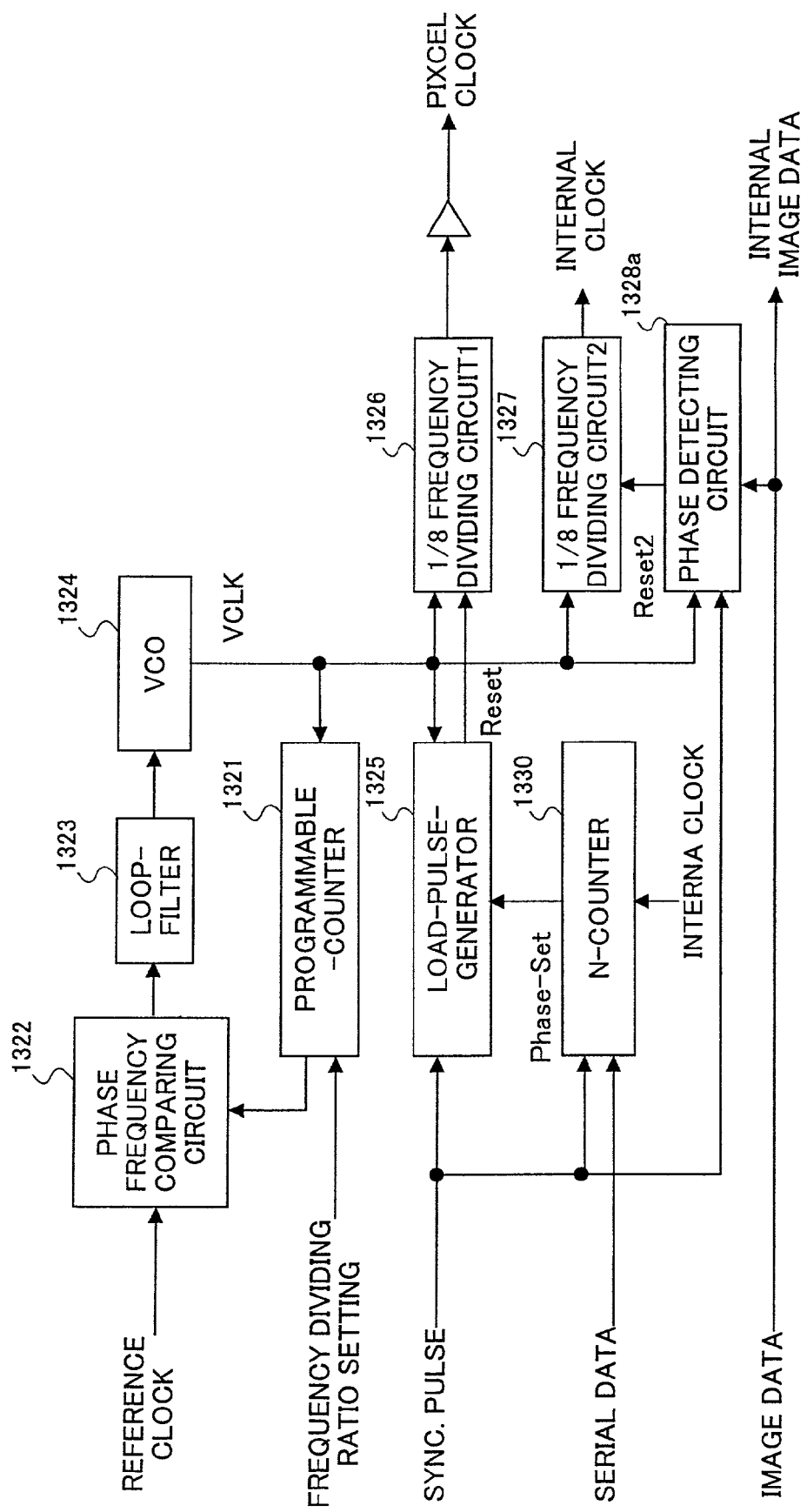
FIG. 33 is a circuit diagram of a circuit which performs VCLK signal generation and pixel clock generation.

In the circuit shown in FIG. 33, an N-count counter (N-Counter) 1330 is added to the composition shown in FIG. 29, and the N-counter 1330 automatically generates the Phase-Set signal for every N-count of an internal clock so as to delay a ⅛ pixel clock phase. In the present embodiment, an optical pulse is not output for the time of ⅛ clock. Even in this way, an exposure energy distribution does not become discontinuous as shown in FIG. 3 (since the light is turned off only for a sufficiently short time with respect to the beam diameter of the semiconductor laser LD, and since it is a timing of segmentation of the pixel).

It should be noted that the count value N of the N-counter 1330 can be externally set by serial data. By doting this, a frequency unit, which cannot be set by PLL-LOOP, can be set, which equivalents to finer setting of the frequency unit.

The variation in the distance from the axis of rotation of a deflection reflective surface (variation in an inscribed circle radius) generates unevenness in the scanning speed of the optical spot (scanning beam) which scans a surface to be scanned. After detecting synchronous light, a write-in signal is issued at a predetermined timing and a semiconductor laser starts light emission, data corresponding to a single scanning line is sent to each source of light emission, and thereby, an image is formed as a latent image on a scanned medium. At this time, unevenness (variation) of the scanning length of each scanning line appears according to the above-mentioned factor in the deflector such as a polygon scanner. Such unevenness is mainly conspicuous at an edge of image as well as a write-in magnification error, and the variation in the above-mentioned write-in end appears as fluctuation of an image end.

According to the present invention, the variation in the scanning width can also be corrected by shifting the phases of the above-mentioned pixel clock and internal clock. The variation in the scanning width the deflector as a cause is generated due to a change in the deflection reflective surface, and the variation occurs periodically in accordance with the period of the deflection reflective surface. Accordingly, it is needed to distinguish whether which surface of the deflection reflective surface is being scanned. In one example of such a method, a mark is provided on a top surface of the deflector so that one rotation can be recognized as the mark is read. Moreover, an input signal is obtained by a synchronization detecting system before starting each scanning operation, and it can be determined whether which surface is scanned by the two kinds of information.

Figure 34:
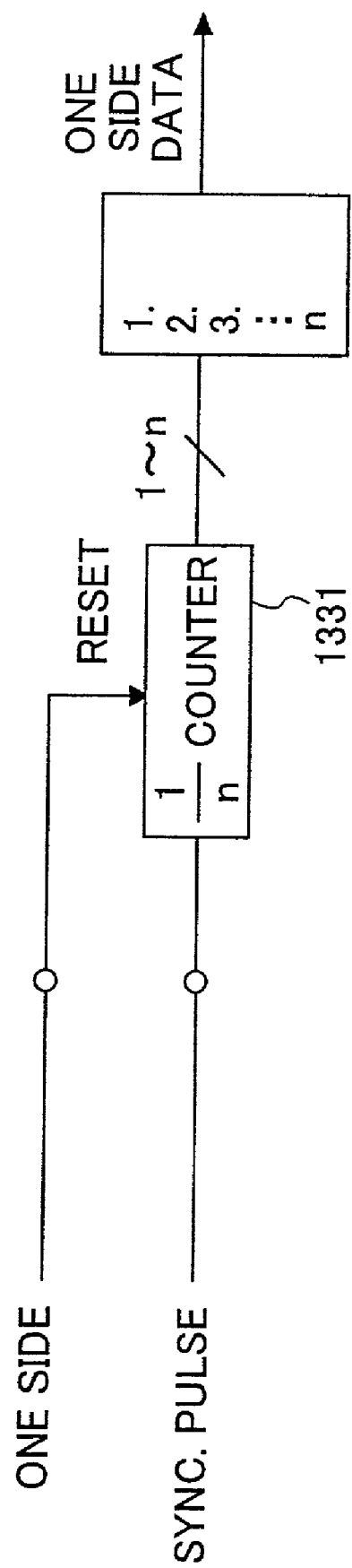
FIG. 34 is a circuit diagram of a detection circuit for a deflecting surface.

Now description will be given with reference to FIG. 34, a 1/n counter (1/n Counter) 1331 is reset by a mark detection signal from a deflector, and after the reset the 1/n counter (1/n Counter) 1331 restart the count of the synchronous pulse signals so as to count 1, 2, 3 . . . , n surfaces, and, then, reset again by the mark detection signal from the deflector. By this repetition, it can be determined whether which surface of the deflector is being scanned.

Figure 35:
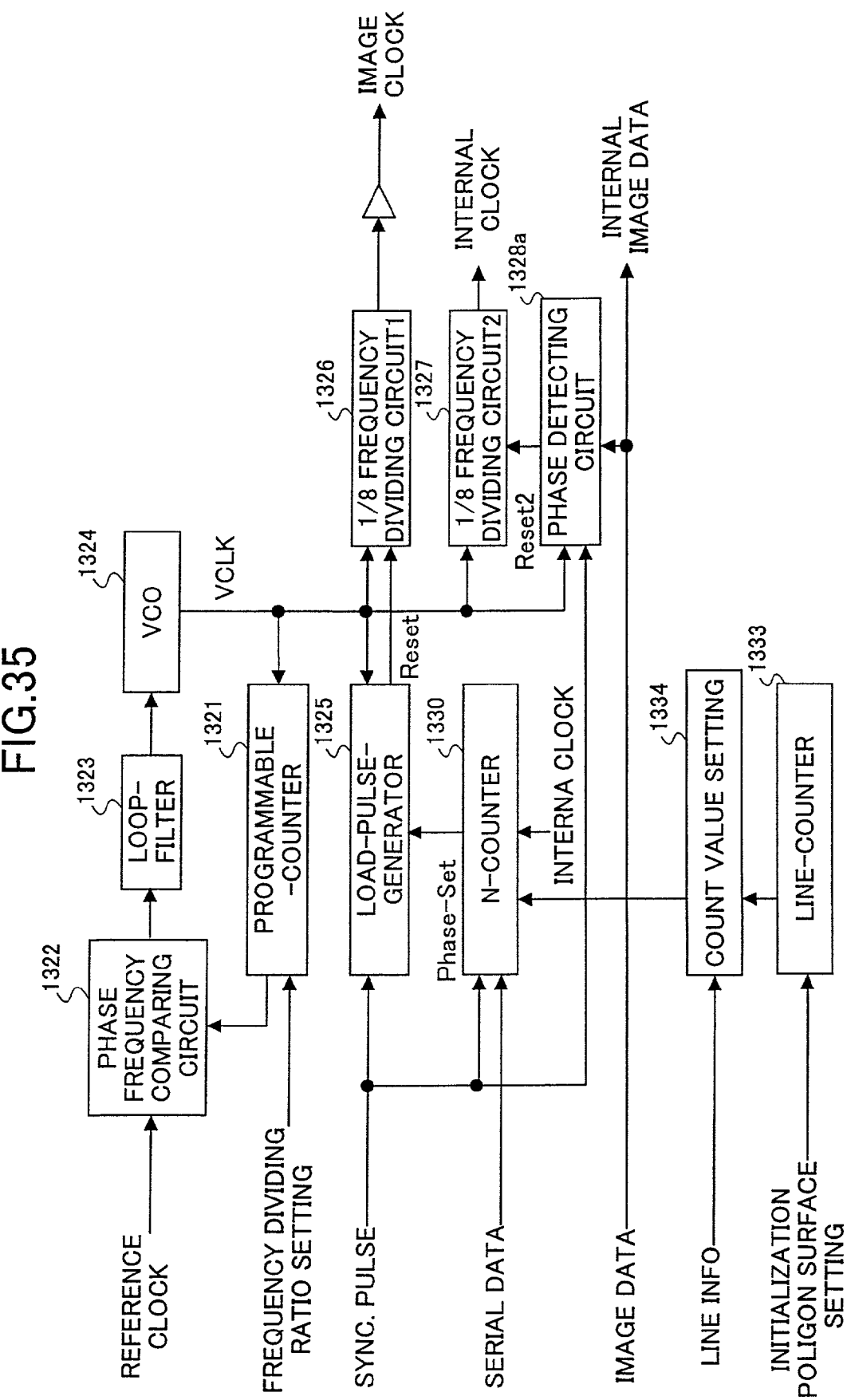
FIG. 35 is a block diagram of a high-frequency clock and pixel clock generation circuit according to the present invention.

In FIG. 35, a line counter 1333 and a count value setting part 1334 are added to the structure shown in FIG. 33. Since scanning width expands and contracts due to a deflection reflective surface, information regarding each surface is stored in the count value setting part 1334 as line information so as to load the line information to the N-counter 1330 in accordance with a discrimination signal, which indicates a surface to be scanned by the line counter 1333 next, and determines how to shift the phases of the pixel clock and the internal clock based on the information. That is, loading the line information to the N-counter 1330 based on the data from the line counter with respect to the recognized number of surfaces of the deflector so a to set the count value, and generating the Phase-Set signal by the N-counter, and shifting the phase. It should be noted that the above-mentioned operation is not limited by the number of light sources, and a similar elect can be provided even in a case in which the number of light sources is one or a plurality of light sources are provided.

Here, the timing which controls the phase of the internal clock with respect to the pixel clock according to phase data is the same as that of the timing shown in FIG. 13 in the above-mentioned first embodiment. Moreover, as explained with reference to FIG. 14, the number of bits of the look-up table may be reduced.

Moreover, also in the present embodiment, the circuit structure shown in FIGS. 16 to 19 explained in the above-mentioned first embodiment may be used.

Figure 36:
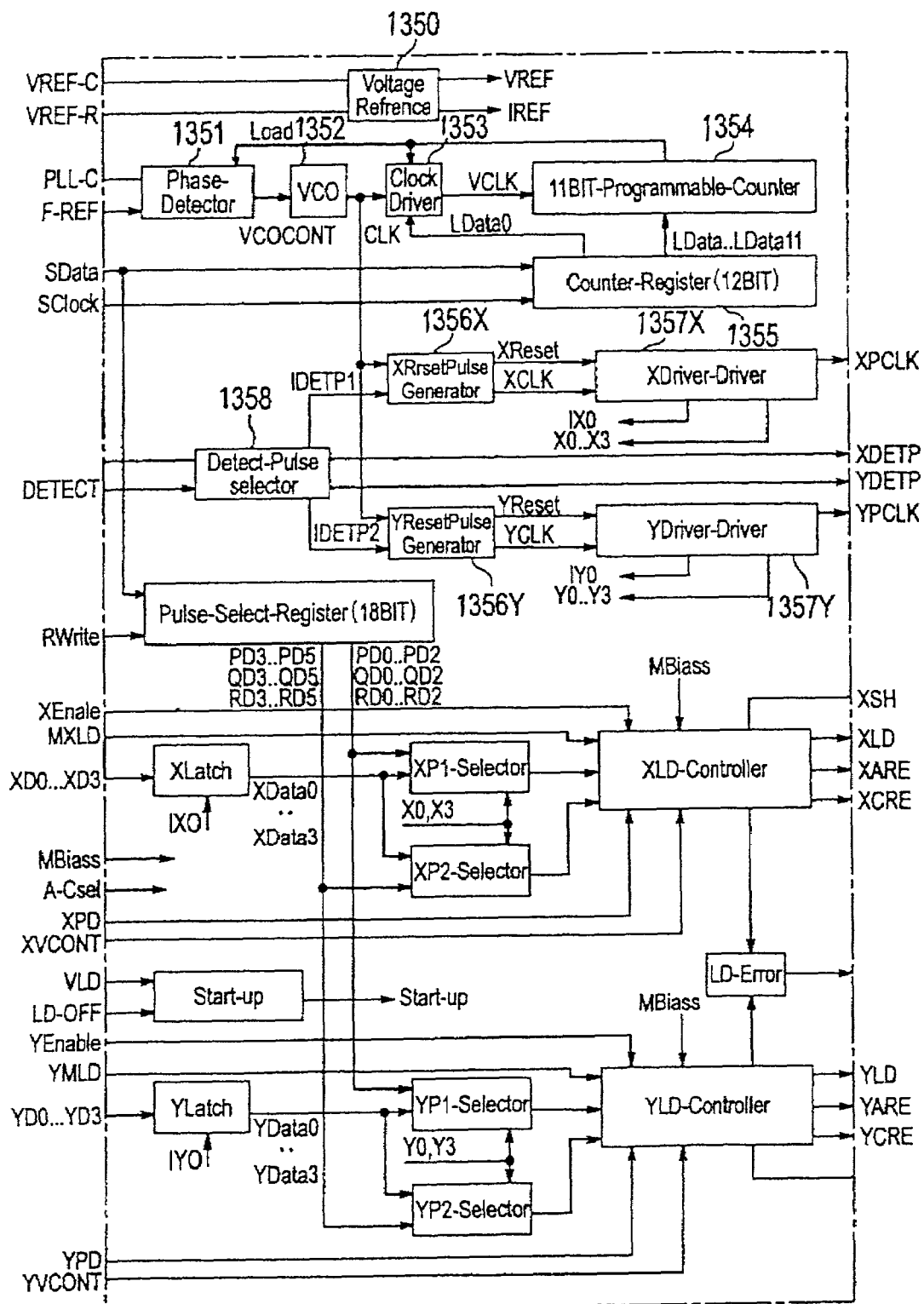
FIG. 36 is a structural diagram of a chip in a case in which a circuit according to a second embodiment of the present invention is realized as a single chip IC.

FIG. 36 is a structural diagram of a chip in a case in which the above-mentioned matters put together so as to achieve a single chip IC. Additionally, in the present embodiment, the pixel clock frequency is the same frequency, the synchronous signal can be controlled separately in two kinds, and a circuit part which controls and modulates the semiconductor laser has two channels. In the figure, a reference power supply circuit (Voltage-Reference) 1350 is provided for whole IC, and supplies reference voltages VREF and IREF to other circuit blocks. A phase detector (Phase-Detector) 1351, a VCO 1352, a clock driver (Clock-Driver) 1353, an 11-bit programmable counter (11BIT-Programmable-Counter) 1354 constitute a PLL-LOOP circuit. The lower order 1 bit from among the 12 bit data set in the counter register 1355 is set so as to delay the phase of the output clock VCLK by π, and the upper 11 bits set the frequency dividing ratio of the programmable counter 1354. As mentioned above, the frequency of the CLK is set to F-REF×N/2 (N: 12-bit data).

Synchronizing with primary scanning synchronization signals (DETP1 signal and DETP2 signal) form a detect pulse modulator 1358, an X-reset pulse generator (XReset-Pulse-Generator) 1356X and a Y-reset pulse generator (YResetPulse-Generator) 1356Y output an Xreset signal and a Yreset signal and an XCLK signal and a YCLK signal, which has selected whether normal or reverse of the CLK signal, to an X-divider driver (Xdivider-driver) 1357X and a Y-divider driver (Ydivider-Driver), respectively.

According to the Xreset signal, Yreset signal, the XCLK signal and the YCLK signal, drivers 1357X and 1357Y carry out quarter-division, and output pixel clocks XPCLK and YPCLK which synchronized with an XDEPT signal and a YDEPT signal from a selector 1358.

Figure 37:
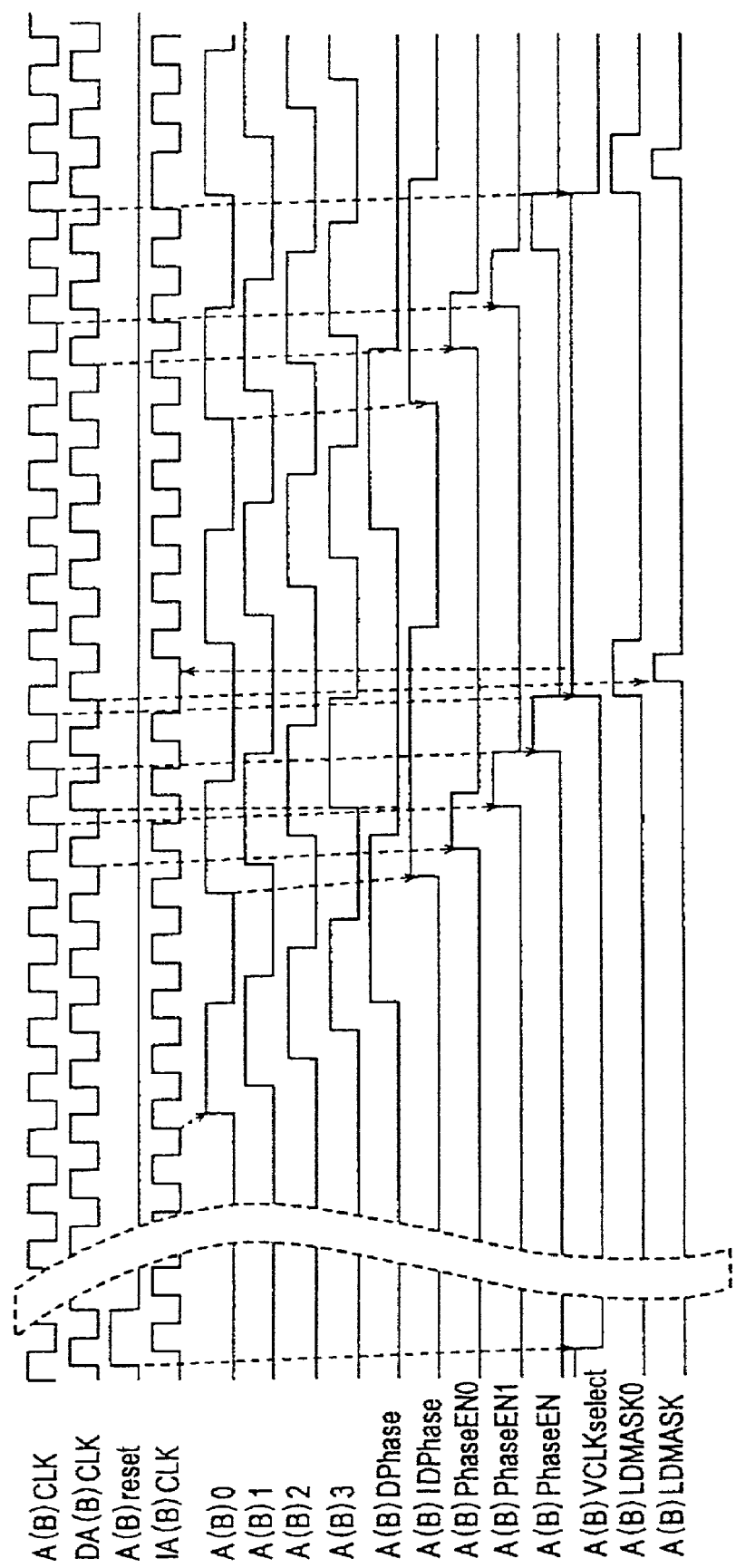
FIG. 37 is a timing chart showing main signals in FIG. 36.

Moreover, according to a timing chart shown in FIG. 37, and according to the rising edge of an ADPhase signal and a BDPhase signal, the pixel clock can be delayed by ⅛ phase. Consequently, a delay control of the pixel clock start position can be carried out for every ⅛ clock cycle for every line scanning.

Moreover, the pixel clock frequency can be changed into FCLK×N/(N+M/8) in equivalent by giving a rising edge M times during the scanning of one line. Furthermore, as shown in the timing chart of FIG. 37, the pixel clock is delayed by ⅛ clock cycle by generating ALDMASK and BLKMASK signals, and forcibly turning off the semiconductor laser at the timing so that an image intensity is not rapidly changed.

In this case, if ⅛ intensity is reduced previously, there is no need to make a forcible turn-off although an automatic turn-off is made. Thus, in a case in which ⅛ is reduced from the image data beforehand, an LDMASK signal is rendered to be ineffective by setting a MaskEN signal to high.

Figure 38:
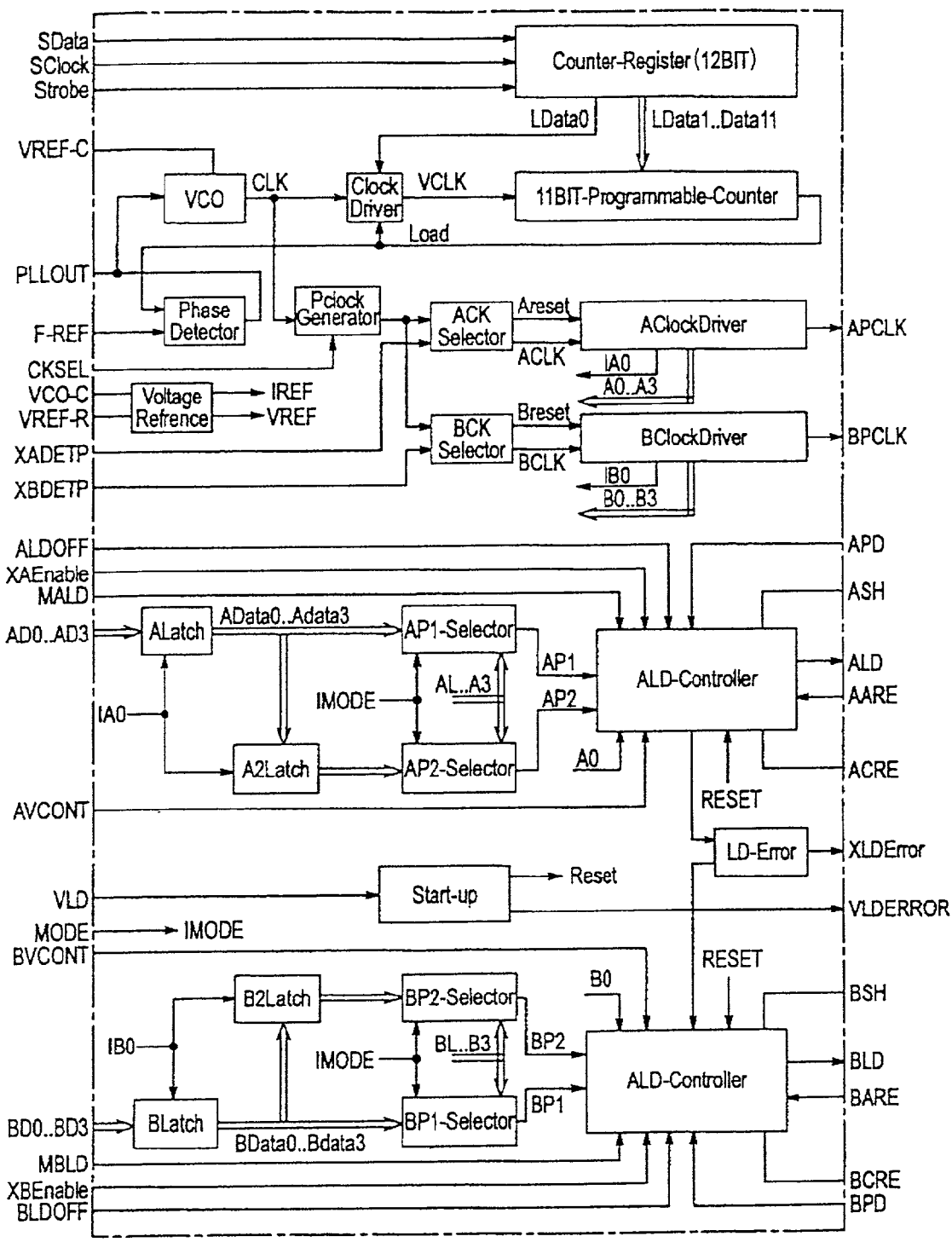
FIG. 38 is a structural diagram of a chip which is constituted so as to generate an optical modulation pulse according to a predetermined rule.

FIG. 38 shows an example of a structure in which an optical modulation pulse is generated in accordance with a previously determined rule.

It should be noted that also in the present invention, as explained in the above-mentioned first embodiment, the circuit structure shown in FIG. 22 or FIG. 23 my be adopted so as to write program codes in a code area program counter by a serial interface.

Figure 39:
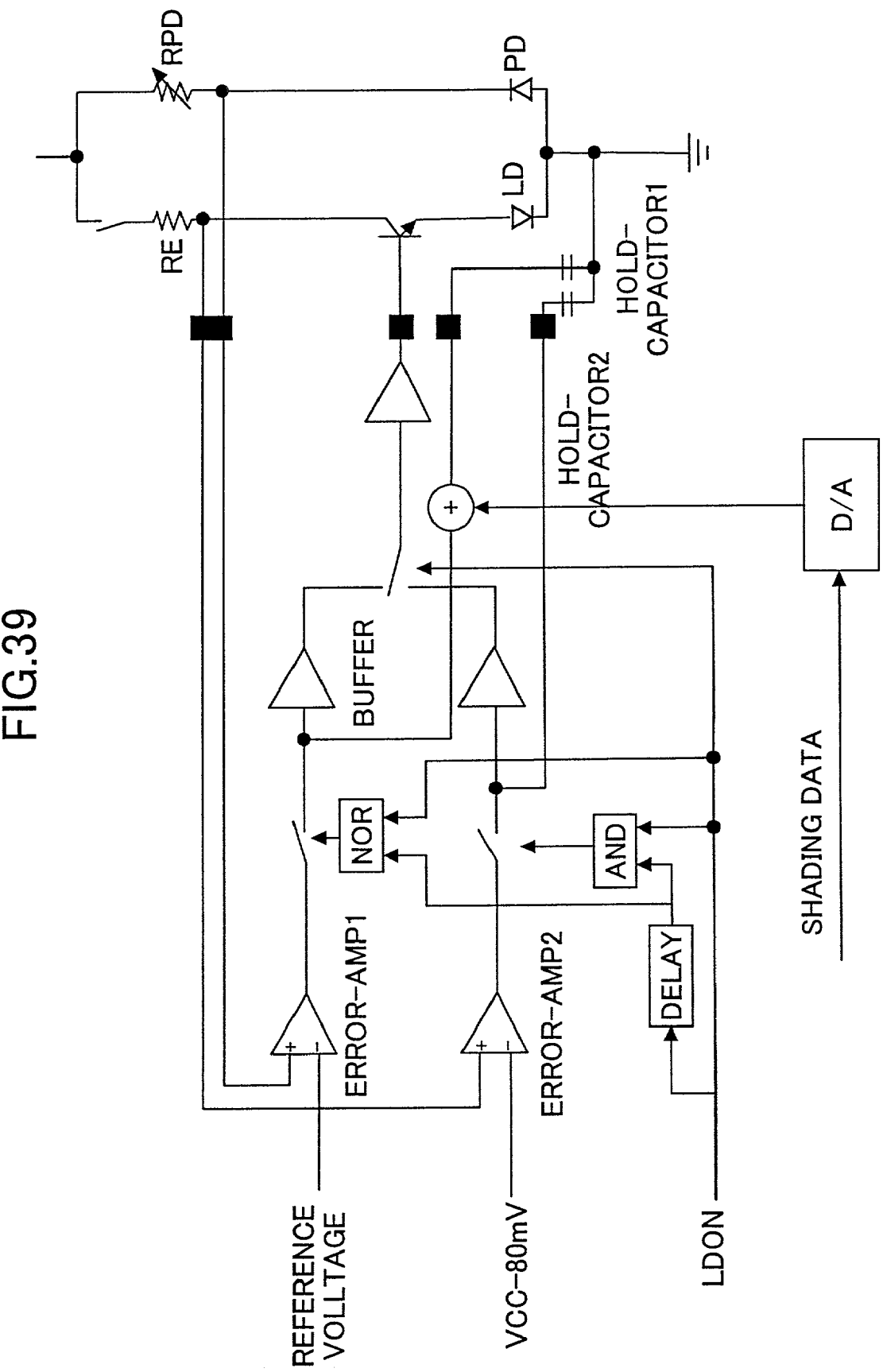
FIG. 39 is a circuit diagram of a circuit which is formed by adding a structure to add shading data to the circuit structure shown in FIG. 16.

Additionally, FIG. 39 shows a circuit in which shading data is added to the circuit structure shown in FIG. 16.

The present invention is not limited to the specifically disclosed embodiments, and variations and modifications may be made without departing from the scope of the present invention.

The present application is based on Japanese priority applications No. 2000-167886 filed on June 5, No. 2000-227488 filed on Jul. 27, 2000 and No. 2000-227497 filed on Jul. 27, 2000, the entire contents of which are incorporated herein by reference.

What is claimed is:

1. An image forming apparatus comprising:
   a semiconductor laser;
   an optical unit which scans a rotational photo conductor by a laser light output by said semiconductor laser; and a photodetector which detects the laser light output by said semiconductor laser at a predetermined position, wherein a latent image is formed by scanning said rotational photo conductor based on the laser light detected by the photodetector, said image forming apparatus further comprising:

a high-frequency clock generation circuit;

a generator configured to generate load data and a phase set signal;

a first frequency divider which generates and outputs an image clock which is synchronized with an output of said photodetector by dividing a clock output from the high-frequency clock generation circuit by a frequency dividing number selected based on the load data loaded by the generator; and an image clock phase changing circuit which changes a phase of the image clock based on the phase set signal.

2. The image forming apparatus as claimed in claim 1, wherein said high-frequency clock generation circuit comprises:

a voltage controlled oscillator which controls an oscillation frequency of a clock, which is output according to an input signal;

a second frequency divider which divides the clock oscillated by the voltage controlled oscillator;

a phase comparator which compares a phase of the clock output by the frequency divider with a phase of a frequency of a reference clock so as to output a signal corresponding to a result of the comparison, wherein the signal output by the phase comparator is input to said voltage controlled oscillator.

3. The image forming apparatus as claimed in claim 1, further comprising:

an image data input circuit which inputs image data based on said image clock;

a modulation pattern generation circuit which generates a modulation pattern based on said image data and the clock output from said high-frequency clock generation circuit; and a semiconductor laser control circuit which controls the output of said semiconductor laser based on the modulation pattern generated by the modulation pattern generation circuit.

4. The image forming apparatus as claimed in claim 3, wherein said first frequency divider, said image clock phase change circuit, said high-frequency clock generator circuit, said image data input circuit and said modulation pattern generation circuit are constituted by an integrated circuit formed in a single semiconductor chip.

5. The image forming apparatus as claimed in claim 4, wherein the generator sets the frequency dividing ratio for said first and second frequency dividers.

6. The image forming apparatus as claimed in claim 4, further comprising a pulse reversal circuit which reverses or forwards a phase of pulses oscillated by said voltage controlled oscillator.

7. The image forming apparatus as claimed in claim 4, further comprising a frequency dividing operation stop and resumption circuit which stops or resumes an operation of said second frequency divider.

8. The image forming apparatus as claimed in claim 6, further comprising a semiconductor laser turn-off circuit which switches off said semiconductor laser at a timing which delays the phase of said pixel clock.

9. An image forming apparatus comprising:

a semiconductor laser;

an optical unit which scans a rotational photo conductor by a laser light output by said semiconductor laser; and a photodetector which detects the laser light output by said semiconductor laser at a predetermined position, wherein a latent image is formed by scanning said rotational photo conductor based on the laser light detected by the photodetector, said image forming apparatus further comprising:

a high-frequency clock generation circuit;

a generator configured to generate load data and a phase set signal;

a frequency divider which generates and outputs an image clock which is synchronized with an output of said photodetector by dividing a clock output from the high-frequency clock generation circuit by a frequency dividing number selected based on the load data loaded by the generator;

an image data input circuit which inputs image data based on said image clock;

a semiconductor laser modulation circuit which modulates an output of said semiconductor laser based on a clock output from said high-frequency clock generation circuit and the image data input by said image data input circuit; and a phase change-circuit which changes a timing which said image data input circuit takes in the image data and a phase of said image clock at the same time based on the phase set signal.

10. The image forming apparatus as claimed in claim 9, wherein said phase change-circuit changes the timing for taking in the image data and the phase of the clock of said image clock based on a first synchronous signal received by the generator at a time of power supply and a turn-off data timing of synchronous signal detection data.

11. The image forming apparatus as claimed in claim 9, wherein said phase change circuit changes the timing for taking in the image data and the phase of said image clock for every scanning timing.

12. The image forming apparatus as claimed in claim 9, wherein said phase change circuit changes the timing for taking in the image data and the phase of said image clock only at a first line of a page.

13. The image forming apparatus as claimed in claim 9, wherein the phase of said image clock is changed when being output, and the timing which said image data input circuit takes in data and a timing which said modulation pattern generating circuit generates a modulation pattern are not changed.

14. An image forming apparatus comprising:

a semiconductor laser;

scanning means for scanning a rotational photo conductor by a laser light output by said semiconductor laser; and scanning light detecting means for detecting the laser light output by said semiconductor laser at a predetermined position, wherein a latent image is formed by scanning said rotational photo conductor based on the laser light detected by the scanning light detecting means, said image forming apparatus further comprising:

high-frequency clock generation means;

means for generating load data and a phase set signal;

image clock outputting means for generating and outputting an image clock which is synchronized with an output of said scanning light detecting means by dividing a clock output from the high-frequency clock generation means by a frequency dividing number selected based on the load data sent by the means for generating; and image clock phase change means for changing a phase of the image clock based on the phase set signal.

15. The image forming apparatus as claimed in claim 14, wherein said high-frequency clock generation means comprises:

voltage controlled oscillator means for controlling an oscillation frequency of a clock, which is output according to an input signal;

frequency dividing means for dividing the clock oscillated by the voltage controlled oscillator means;

phase comparing means for comparing a phase of the clock output by the frequency dividing means with a phase of a frequency of a reference clock so as to output a signal corresponding to a result of the comparison, wherein the signal output by the phase comparing means is input to said voltage controlled oscillator means.

16. The image forming apparatus as claimed in claim 14, further comprising:

image data input means for inputting image data based on said image clock;

modulation pattern generation means for generating a modulation pattern based on said image data and the clock output from said high-frequency clock generation means; and semiconductor laser control means for controlling the output of said semiconductor laser based on the modulation pattern generated by the modulation pattern generation means.

17. The image forming apparatus as claimed in claim 16, wherein said image clock output means, said image clock phase change means, said high-frequency clock generator means, said image data input means and said modulation pattern generation means are constituted by an integrated circuit formed in a single semiconductor chip.

18. The image forming apparatus as claimed in claim 17, wherein said image clock outputting means further comprises frequency dividing ratio setting means for setting a frequency dividing ratio based on the load data sent by the means for generating.

19. The image forming apparatus as claimed in claim 17, further comprising pulse reversal means for reversing or forwarding a phase of pulses oscillated by said voltage controlled oscillator means.

20. The image forming apparatus as claimed in claim 17, further comprising frequency dividing operation stop and resumption means for stopping or resuming an operation of said frequency divider.

21. The image forming apparatus as claimed in claim 20, further comprising semiconductor laser turn-off means for switching off said semiconductor laser at a timing which delays the phase of said pixel clock.

22. An image forming apparatus comprising:

a semiconductor laser;

scanning means for scanning a rotational photo conductor by a laser light output by said semiconductor laser; and scanning light detecting means for detecting the laser light output by said semiconductor laser at a predetermined position, wherein a latent image is formed by scanning said rotational photo conductor based on the laser light detected by the scanning light detecting means, said image forming apparatus further comprising:

high-frequency clock generation means;

means for generating load data and a phase set signal;

image clock output means for generating and outputting an image clock which is synchronized with a timing detected by said scanning light detecting means by dividing a clock from said high-frequency clock generation means by a frequency dividing number selected based on the load data sent by the means for generating;

image data input means for inputting image data based on said image clock;

semiconductor laser modulation means for modulating an output of said semiconductor laser based on a clock output from said high-frequency clock generation means and the image data which input said image data input means; and phase change means for changing a timing, which said image data input means takes in the image data, and a phase of said image clock at the same time based on the phase set signal.

23. The image forming apparatus as claimed in claim 22, wherein said phase change means changes the timing for taking in the image data and the phase of the clock of said image clock based on a first synchronous signal received by the means for generating at a time of power supply and a turn-off data timing of synchronous signal detection data.

24. The image forming apparatus as claimed in claim 22, wherein said phase change means changes the timing for taking in the image data and the phase of said image clock for every scanning timing.

25. The image forming apparatus as claimed in claim 22, wherein said phase change means changes the timing for taking in the image data and the phase of said image clock only at a first line of a page.

26. The image forming apparatus as claimed in claim 9, wherein the phase of said image clock is changed when being output, and the timing which said image data input means takes in data and a timing which said modulation pattern generating means generates a modulation pattern are not changed.

27. An image forming apparatus comprising:

a plurality of light-emitting parts each configured to output a light flux;

an optical scanning unit which scans the plurality of light fluxes on a medium to be scanned, the light fluxes being synchronous with an output pixel clock and being modulated in accordance with image data of a respective one of a plurality of lines; and a clock phase control circuit which controls a phase of said output pixel clock for each of said lines so as to correct a shift in a write start position in a scanning direction due to a shift in a position of each light-emitting point of said plurality of light fluxes, said clock phase control circuit including, a high-frequency clock generator, a generator configured to generate load data and a phase set signal, a first frequency divider configured to generate said output pixel clock by dividing an output of said high-frequency clock generator by a frequency dividing number selected based on the load data loaded by the generator, the first frequency divider including a circuit configured to change a phase of said output pixel clock, and a phase change circuit configured to change a phase of said first frequency divider based on the phase set signal.

28. The image forming apparatus as claimed in claim 27, wherein said clock phase control circuit further comprises:

a second frequency divider configured to generate an internal clock by dividing an output of said high-frequency clock generator, the second frequency divider including a circuit which can change a phase of said internal clock.

29. The image forming apparatus as claimed in claim 28, wherein said high-frequency clock generator is constituted by a PLL circuit comprising: a voltage controlled oscillator circuit; a programmable counter which divides an output of said voltage controlled oscillator circuit; and a phase comparator circuit which compares phases of an output of said programmable counter and a reference frequency, wherein said first frequency divider generates said output pixel clock by dividing an output of said voltage controlled oscillator circuit and a phase of said output pixel clock is synchronized with a phase synchronous signal.

30. The image forming apparatus as claimed in claim 29, further comprising a modulation pattern generating circuit which generates a modulation pattern by which an optimum exposure energy is obtained based on the image data in synchronization with said output pixel clock.

31. The image forming apparatus as claimed in claim 30, wherein said modulation pattern generating circuit can change a phase of the output pixel clock for each of a plurality of lines.

32. The image forming apparatus as claimed in claim 31, wherein said first frequency divider, said phase change circuit, said PLL circuit and said modulation pattern generating circuit are formed in a single integrated circuit.

33. The image forming apparatus as claimed in claim 32, wherein said integrated circuit further comprises a semiconductor laser modulation drive circuit.

34. An image forming apparatus comprising:
a plurality of light-emitting parts each configured to output a light flux;
an optical scanning unit which scans the plurality of light fluxes on a medium to be scanned, the light fluxes being synchronous with an output pixel clock and being modulated in accordance with image data of a respective one of a plurality of lines; and
clock phase control means for controlling a phase of said output pixel clock for each of said lines so as to correct a shift in a write start position in a scanning direction due to a shift in a position of each light-emitting point of said plurality of light fluxes, said clock phase control means including,
high-frequency clock generator means,
means for generating load data and a phase set signal,
a first frequency dividing means for generating said output pixel clock by dividing an output of said high-frequency clock generator means by a frequency dividing number selected based on the load data sent by the means for generating, the first frequency dividing means having means for changing a phase of said output pixel clock, and
phase change means for changing a phase of said first frequency dividing means based on the phase set signal.

35. The image forming apparatus as claimed in claim 34, wherein said clock phase control means further comprises:
second frequency dividing means for generating an internal clock by dividing an output of said high-frequency clock generator, the second frequency dividing means having means for changing a phase of said internal clock.

36. An image forming apparatus comprising:
a plurality of light-emitting parts each configured to output a light flux;
an optical scanning unit which scans the plurality of light fluxes on a medium to be scanned by deflecting the light fluxes by a deflector, the light fluxes being synchronous with an output pixel clock and being modulated in accordance with image data of a respective one of a plurality of lines; and
a clock phase control circuit which controls a phase of said output pixel clock for each of a plurality of deflecting surfaces of said deflector so as to correct a fluctuation in a scanning length corresponding to the plurality of deflecting surfaces, the clock phase control circuit including,
a high-frequency clock generator,
a generator configured to generate load data and a phase set signal,
a first frequency divider configured to generate said output pixel clock by dividing an output of said high-frequency clock generator by a frequency dividing number selected based on the load data loaded by the generator, the first frequency divider including a circuit which can change a phase of said output pixel clock, and
a phase change circuit configured to change a phase of said first frequency divider based on the phase set signal.

37. The image forming apparatus as claimed in claim 36, wherein said clock phase control circuit further comprises:
a second frequency divider configured to generate an internal clock by dividing an output of said high-frequency clock generator, the second frequency divider including a circuit which can change a phase of said internal clock.

38. The image forming apparatus as claimed in claim 37, wherein said high-frequency clock generator is constituted by a PLL circuit comprising: a voltage controlled oscillator circuit; a programmable counter which divides an output of said voltage controlled oscillator circuit; and a phase comparator circuit which compares phases of an output of said programmable counter and a reference frequency, wherein said first frequency divider generates said output pixel clock by dividing an output of said voltage controlled oscillator circuit and a phase of said output pixel clock is synchronized with a phase synchronous signal.

39. The image forming apparatus as claimed in claim 38, further comprising a modulation pattern generating circuit which generates a modulation pattern by which an optimum exposure energy is obtained based on the image data in synchronization with said output pixel clock.

40. The image forming apparatus as claimed in claim 39, wherein said modulation pattern generating circuit can change a phase of the output pixel clock for each of a plurality of lines.

41. The image forming apparatus as claimed in claim 40, wherein said first frequency divider, said phase change circuit, said PLL circuit and said modulation pattern generating circuit are formed in a single integrated circuit.

42. The image forming apparatus as claimed in claim 41, wherein said integrated circuit further comprises a semiconductor laser modulation drive circuit.

43. An image forming apparatus comprising:
a plurality of light-emitting parts each configured to output a light flux;
an optical scanning unit which scans the plurality of light fluxes on a medium to be scanned by deflecting the light fluxes by a deflector, the light fluxes being synchronous with an output pixel clock and being modulated in accordance with image data of a respective one of a plurality of lines; and clock phase control means for controlling a phase of said output pixel clock for each of a plurality of deflecting surfaces of said deflector so as to correct a fluctuation in a scanning length corresponding to the plurality of deflecting surfaces, the clock phase control means including, high-frequency clock generator means, means for generating load data and a phase set signal, first frequency dividing means for generating said output pixel clock by dividing an output of said high-frequency clock generator means by a frequency dividing number selected based on the load data loaded by the means for generating, the first frequency dividing means having means for changing a phase of said output pixel clock, and phase change means for changing a phase of said first frequency dividing means based on the phase set signal.

44. The image forming apparatus as claimed in claim 43, wherein said clock phase control means further comprises:

second frequency dividing means for generating an internal clock by dividing an output of said high-frequency clock generator means, the second frequency dividing means having means for changing a phase of said internal clock.

* * * * *